US008995725B2

(12) United States Patent
Li et al.

(10) Patent No.: US 8,995,725 B2
(45) Date of Patent: Mar. 31, 2015

(54) ON-SITE COMPOSITION AND AESTHETICS FEEDBACK THROUGH EXEMPLARS FOR PHOTOGRAPHERS

(71) Applicant: The Penn State Research Foundation, University Park, PA (US)

(72) Inventors: Jia Li, State College, PA (US); Lei Yao, State College, PA (US); James Z. Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 14/308,008

(22) Filed: Jun. 18, 2014

(65) Prior Publication Data

US 2014/0363085 A1    Dec. 11, 2014

Related U.S. Application Data

(63) Continuation of application No. 13/493,564, filed on Jun. 11, 2012, now Pat. No. 8,781,175, which is a continuation-in-part of application No. 12/116,578, filed on May 7, 2008, now abandoned.

(60) Provisional application No. 60/916,467, filed on May 7, 2007.

(51) Int. Cl.
*G06K 9/00*      (2006.01)
*G06K 9/62*      (2006.01)
(Continued)

(52) U.S. Cl.
CPC .......... *G06K 9/6267* (2013.01); *G06K 9/00624* (2013.01); *G06K 9/4652* (2013.01); *G06K 9/4671* (2013.01); *G06K 9/6228* (2013.01); *G06K 9/46* (2013.01); *H04N 5/23222* (2013.01)

USPC .......................................... 382/112; 382/224

(58) Field of Classification Search
None
See application file for complete search history.

(56) References Cited

U.S. PATENT DOCUMENTS 6,516,154 B1 *   2/2003   Parulski et al. ............... 396/287
6,801,661 B1    10/2004   Sotak et al.

(Continued)

OTHER PUBLICATIONS

R. Datta, J. Li, J. Z. Wang; "Learning the Consensus on Visual Quality for Next-Generation Image Management," Proceedings of the ACM Multimedia Conference, pp. 533-536, ACM, Augsburg, Germany, Sep. 2007.

(Continued)

*Primary Examiner* — Daniel Mariam
(74) *Attorney, Agent, or Firm* — Gifford, Krass, Sprinkle, Anderson & Citkowski, P.C.

(57) ABSTRACT

A comprehensive system to enhance the aesthetic quality of the photographs captured by mobile consumers provides on-site composition and aesthetics feedback through retrieved examples. Composition feedback is qualitative in nature and responds by retrieving highly aesthetic exemplar images from the corpus which are similar in content and composition to the snapshot. Color combination feedback provides confidence on the snapshot to contain good color combinations. Overall aesthetics feedback predicts the aesthetic ratings for both color and monochromatic images. An algorithm is used to provide ratings for color images, while new features and a new model are developed to treat monochromatic images. This system was designed keeping the next generation photography needs in mind and is the first of its kind. The feedback rendered is guiding and intuitive in nature. It is computed in situ while requiring minimal input from the user.

17 Claims, 26 Drawing Sheets

(51) Int. Cl.
 *G06K 9/46* (2006.01)
 *H04N 5/232* (2006.01)

(56) References Cited

U.S. PATENT DOCUMENTS

| | | |
|---|---|---|
| 6,816,847 B1 | 11/2004 | Toyama |
| 7,194,380 B2 | 3/2007 | Barrow et al. |
| 7,272,586 B2 | 9/2007 | Nauck et al. |
| 8,238,615 B2 | 8/2012 | Cerosaletti et al. |
| 8,332,429 B2 | 12/2012 | Poirier et al. |
| 8,508,622 B1 | 8/2013 | Anon |
| 8,660,342 B2 * | 2/2014 | Obrador et al. ............... 382/164 |
| 8,737,768 B2 * | 5/2014 | Gomi ........................... 382/286 |
| 2002/0070945 A1 | 6/2002 | Kage |
| 2002/0120619 A1 | 8/2002 | Marso et al. |
| 2012/0177248 A1 | 7/2012 | Shuster |

OTHER PUBLICATIONS

R. Datta, D. Joshi, J. Li, J.Z. Wang; "Studying Aesthetics in Photographic Images Using a Computational Approach," 9th European Conference on Computer Vision, May 2006.

Y. Ke, X. Tang, F. Jing; "The Design of High-Level Features for Photo Quality Assessment," Proc. CVPR 2006.

Ke, Y., X. Tang, F. Jing. "The Design of High-Level Features for Photo Quality Assessment." 2006 IEEE Computer Society Conference on Computer Vision and Pattern Recognition, vol. 1, pp. 419-426.

* cited by examiner

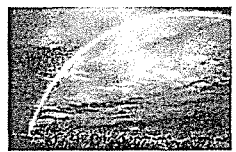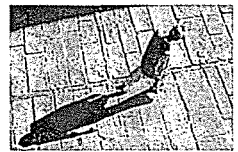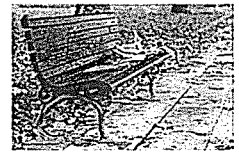
FIG 6A
"vertical" &
"diagonal_ulbr"
FIG. 6B
"horizontal" &
"diagonal_urbl"
FIG. 6C
"vertical" &
"diagonal_urbl"
FIG. 6D
"vertical" &
"diagonal_urbl"

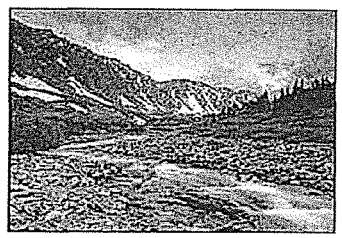
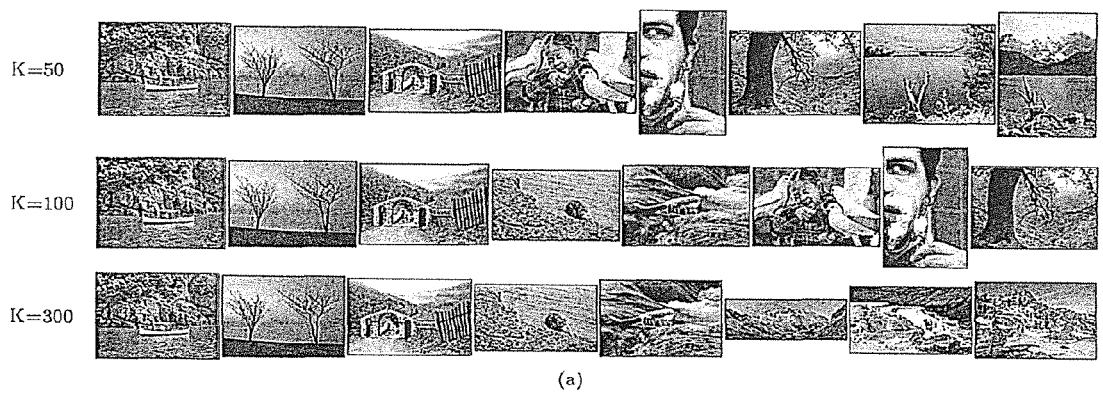
K=50
K=100
K=300
(a)
FIG. 7A

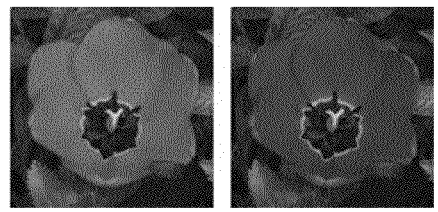
FIG. 8A  FIG. 8B
Color Image   Grayscale Image
      
Avg. Rating: 2.562   Avg. Rating: 5.720   Avg. Rating: 7.041
FIG. 9A   FIG. 9B   FIG. 9C

Box plot of no. of votes

Average rating vs no. of votes

  
(a) Low key  (b) Mid key  (c) High key
FIG. 10A  FIG. 10B  FIG. 10C
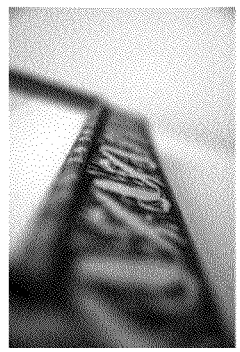 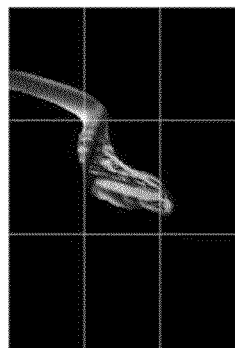
(a) Original Image  (b) Threshold: 75%
FIG. 11A  FIG. 11B
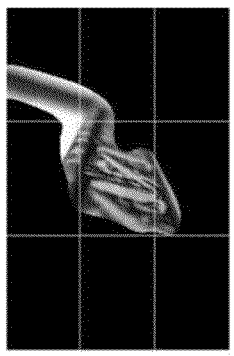 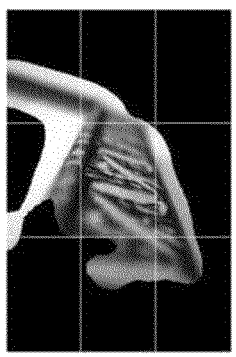
(c) Threshold: 50%  (d) Threshold: 25%
FIG. 11C  FIG. 11D

"horizontal"

"vertical"

"centered"

Fig. 21 Composition feedback. Above: photographs re-ranked by composition categorization and aesthetic score. Below: the most aesthetically pleasing color triplet(only for color images) and its confidence score, composition categorization result and aesthetic score.

ON-SITE COMPOSITION AND AESTHETICS FEEDBACK THROUGH EXEMPLARS FOR PHOTOGRAPHERS

REFERENCE TO RELATED APPLICATIONS

This application is a continuation of U.S. patent application Ser. No. 13/493,564, filed Jun. 11, 2012, which is a continuation-in-part of U.S. patent application Ser. No. 12/116,578, filed May 7, 2008, now abandoned, which claims priority to U.S. Provisional Patent Application Ser. No. 60/916,467, filed May 7, 2007, the entire content of all of which is incorporated herein by reference.

GOVERNMENT SPONSORSHIP

This invention was made with government support under Grant Nos. 0347148, 0936948, and 0821527 awarded by The National Science Foundation. The government has certain rights in the invention.

FIELD OF THE INVENTION

This invention relates generally to digital image analysis and, in particular, to predicting photo aesthetics using mathematical models.

BACKGROUND OF THE INVENTION

Interest in the research community on the plausibility of predicting the aesthetic quality of images has increased dramatically over the past few years. It was established in Datta et al. (2006) that photo aesthetics, though being subjective, can be estimated using a set of images with a general consensus on their aesthetic quality. Mathematical models could be developed which can predict the aesthetics of any image.

Understanding aesthetics can aid many of the applications like summarization of photo collections (Obrador et al. 2010), selection of high quality images for display (Fogarty et al. 2001) and extraction of aesthetically pleasing images for image retrieval (Obrador et al. 2009). It can also be used to render feedback to the photographer on the aesthetics of his/her photographs. Many other applications have been built around suggesting improvisations to the image composition (Bhattacharya et al. 2010; Liu et al. 2001) through image retargeting, and color harmony (Cohen-Or et al. 2006) to enhance image aesthetics. These applications are more on-line in nature, though they are able to provide useful feedback, it is not on the spot, and requires considerable input from the user. There is no scope for any improvement on the images captured once the user moves away from the location which a professional feedback on-site can accomplish.

SUMMARY OF THE INVENTION

In order to make image aesthetic quality assessment more dynamic and to reach out for the general public with a practical perspective, we developed a system which can provide on-site feedback to the user. The aesthetics of an image is the result of a complex interplay of many factors like the lighting, the subject form, composition, color harmony, etc. We realized the importance of providing feedback on each of the aesthetic primitives separately by which the user infers what aspect of the photograph needs improvement and acts accordingly. We render feedback on the overall quality of the image through aesthetic ratings, the composition of the image through examples of similar images not just in terms of content but also in composition. We suggest improved color triplets and a confidence measure on whether the image contains pleasing combinations of colors.

There are several novel contributions in our composition and aesthetics feedback system. First, we attempt to understand the image aesthetics from a very high-level composition perspective. We discovered that providing feedback on the composition style can help users to re-frame the subject leading to an aesthetically composed image. We recognized that the abstraction of composition can be done by analyzing the arrangement of the objects in the image. This led us to identify five different forms of compositions namely, textured images, diagonally, vertically, horizontally composed and centered images. These composition types are recognized by three classifiers, i.e. the "textured" versus "non-textured" classifier, the diagonal element detector, and the k-NN classifier for "horizontal" "vertical" and "centered." Understanding the composition layout of the query image facilitates the retrieval of images which are similar in composition and content.

A further contribution involves providing feedback on the color triplets present in the image. Earlier works on color harmony (Gill 2000; Sutton and Whelan 2004) were mainly driven by psychoanalysis, but we approached this problem in a data driven fashion. We analyze images from photo.net which received very high and very low ratings and learn a consensus on the color combinations which are predominantly found in top rated images and hence we are able to provide a confident color feedback on the major color combinations present in the image and their aesthetic compliance.

An additional contribution includes the addition of a component to our pre-existing aesthetic quality inferencing system, ACQUINE (Datta and Wang 2010), which automatically provides aesthetic ratings for color images. This novel component instead emphasizes analyzing the aesthetics of black and white images which highly differ from their colored counterparts. We proposed several new promising features for indicating the aesthetic quality and trained a model based on the aesthetic rules customized to monochromatic images extracted from dpchallenge.com.

Casting all of these components together we have an integrated system, which we call OSCAR (On-Site Composition and Aesthetics feedback through exemplars). The system can be easily ported onto a mobile device which travels with the user or can be seen as a remote server which can be accessed through the 3G or 4G networks bringing the research closer to the user. As technology progresses the image-capturing device and server may be integrated into a single portable handheld unit. The system can further be customized into creating personal tutor, which is able to provide feedback based on the user's past photo-taking behavior.

BRIEF DESCRIPTION OF THE DRAWINGS

FIGS. 6A-6D depicts photographs classified into multiple categories. "diagonal_ulbr" represents the diagonal from the upper left corner to the bottom right corner, and "diagonal_urbl" represents the other.

FIGS. 7A and 7B show images retrieved by different values of K, using composition categorization to re-rank results returned by SIMPLIcity. In FIG. 7A, the query image is at the top center and top 8 re-ranked images retrieved when K=50, K=100 and K=300 are shown in three rows; FIG. 7B shows provides a second example with the query image at the top center and the top 8 re-ranked images retrieved when K=50, K=100 and K=200 are shown in three rows;

FIGS. 8A and 8B provide a comparison between Color and Grayscale Image Aesthetics;

FIGS. 9A-9E show sample images and score distribution of images from dpchallenge.com;

FIGS. 10A-10C depict variation in image tonality;

FIGS. 11A-11D show salient regions using different threshold levels;

FIG. 23A shows photos labeled "vertical" by users; FIG. 23B shows photos labeled "Diagonalurbi" by users;

FIG. 25A shows results based on top 4 retrieved images, and FIG. 25B shows results based on top 8 retrieved images;

DETAILED DESCRIPTION OF THE INVENTION

System Architecture

Figure 1:
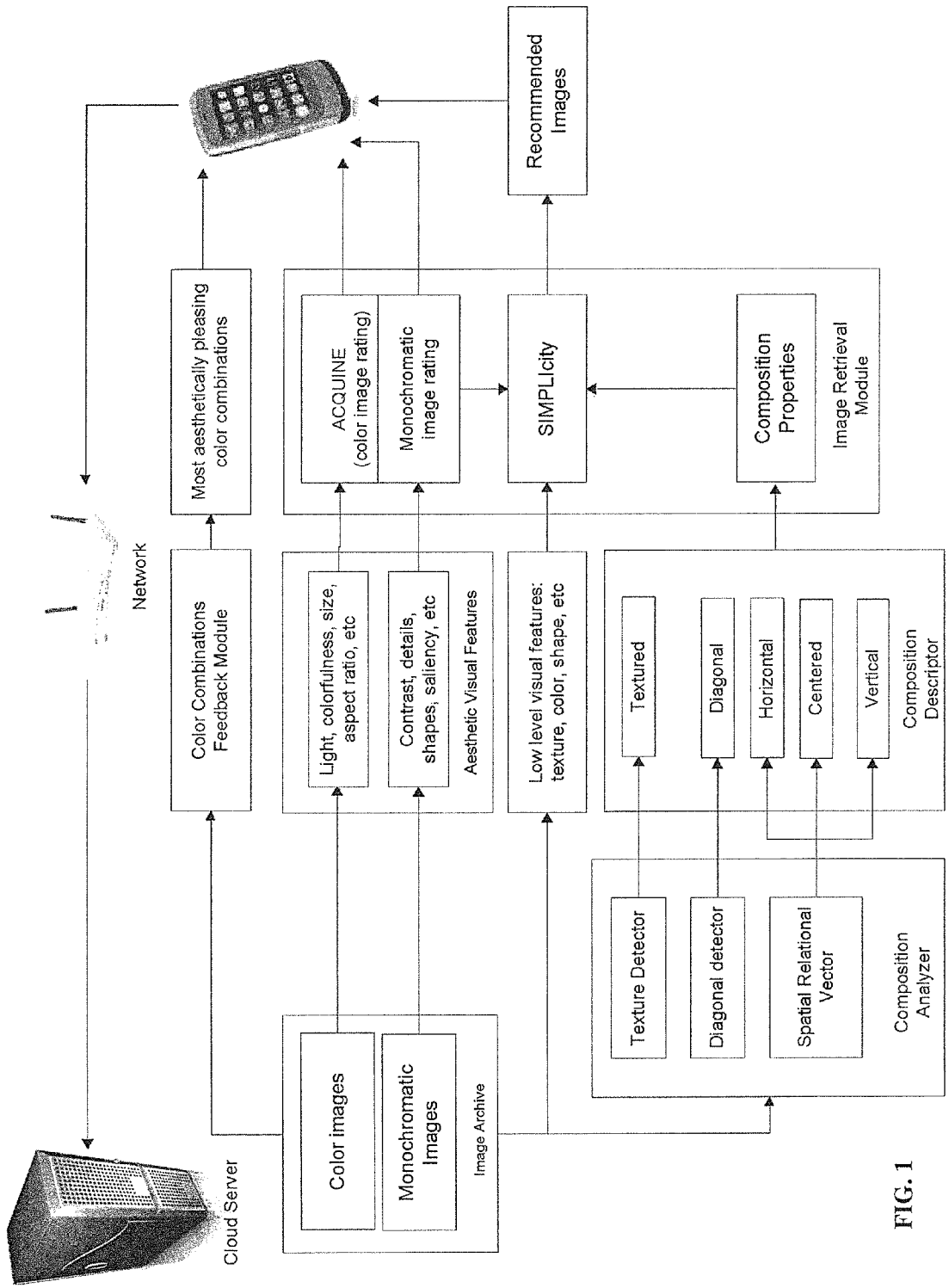
FIG. 1 depicts the architecture of our composition and aesthetics feedback system.

FIG. 1 is a block diagram that shows the architecture of a preferred embodiment. Future generations of digital cameras will access the 3G or 4G network, and have substantial internal computational power in the same way as today's smart phones. Some current camera phones, e.g., the iPhone and the Nokia N73 phone, can send photos to a remote server on the Internet and receive feedback from the server (http://www-.wired.com/gadgetlab/2010/07/nadia-camera-offers-opinion-of-your-terrible-photos/)

As shown in FIG. 1, the system comprises several modules. As a photographer shoots, the photo is sent via the network to a cloud server. Our system on the server side will provide immediate aesthetic quality assessment on the visual characteristics of the submitted photos, analyze their composition and color properties, and send on-site feedback to photographers.

The image archive is used to store all the submitted images, which are labeled as "color images" and "monochromatic images." Given an input image, the composition analyzer will analyze its composition properties from different perspectives. For example, visual elements with important compositional potential, such as diagonals and curves, are detected. Photographs are categorized by high-level composition properties. Specifically, the composition analyzer performs spatial composition categorization. Currently, we consider five categories, namely, "textured," "diagonal," "horizontal," "centered," and "vertical." Composition-related qualities, e.g., visual balance and simplicity of background, can also be evaluated.

Images similar in composition as well as content can be retrieved from a database of photos with high aesthetic ratings so that the photographer can learn through examples. In addition to detecting compositional characteristics, a more constructive feedback to users can be provided through automatic composition correction, where the image is either cropped or tilted to attain better composition.

The color combination feedback module finds the most aesthetically pleasing color combination from that image, with a score indicating the confidence of having high quality. At the same time, some aesthetic related visual features are extracted. For instance, we extract from color images such features as light, colorfulness, size, and aspect ratio, which are provided to ACQUINE for aesthetic quality assessment. We have also developed a similar assessment module for monochromatic images, which incorporates some other features like contrast, details, shapes, saliency, etc.

In the retrieval module, a ranking schema is designed to integrate the composition properties and aesthetic rating into SIMPLIcity, an image retrieval system based on color, texture and shape features (Wang et al. 2001). Images with high aesthetic ratings, as well as similar composition properties and visual features, are retrieved. An effective way to learn photography is through observing master works and imitating. Practicing improved compositions in the field helps develop creative sensibility and unique styling. Especially for beginners, well-composed photographs are valuable learning resources. By retrieving high quality, similarly composed photographs, our system can provide users with practical assistance in improving photography composition.

User Interaction with the System

Figure 2:
FIG. 2 shows a user interface for mobile application. The photo at left was submitted to the server with best color triplets, confidence, and aesthetics scores (indicated by bar). The photo at right illustrates similarly composed exemplars retrieved from the database.

FIG. 2 shows an interface of a mobile application. User interaction and the ease of usage is one of the main concerns for the mobile application to be successful. Once the user takes a snapshot he/she can choose to send the image to our cloud server for feedback on composition and aesthetics. Based on the feedback the user can go on to improve the composition of image by taking newer snaps of the subject and at the same time understand the characteristics in which the photograph might need improvement. A Web-based demonstration of the proposed system is made available at http://acquine.alipr.com/oscar/.

Spatial Composition Categorization

Composition is the art of putting things together with conscious thoughts. In photography, it concerns the arrangement of various visual elements, such as line, color, space, etc. Composition is closely related to the aesthetic qualities of photographs. To the best of our knowledge, very few works have been done on photography composition in image processing and computer vision. Here we study photography composition from the perspective of spatial layout, which is about how visual elements are geometrically arranged in a picture.

After studying many guiding principles in photography, we find that there are several typical spatial layouts. Our goal is to automatically classify major types of spatial layouts. In this paper, we will consider the following typical spatial composition categories: "horizontal", "vertical", "centered", "diagonal", and "textured".

According to long-existing photography principles, lines formed by linear elements are important because they lead the eye through the image and contribute to the mood of the photograph. Horizontal, vertical, and diagonal lines are associated with serenity, strength, and dynamism respectively (Krages 2005). We thus include "horizontal", "vertical", and "diagonal" as three composition categories. Photographs with a centered main subject and a clear background fall into the category "centered". By "textured", we mean that the whole image appears like a patch of texture or a relatively homogeneous pattern, for example, an image of a brick wall.

The five categories of composition are not mutually exclusive. We apply several classifiers sequentially to an image: "textured" versus "non-textured", "diagonal" versus "non-diagonal", and finally a possibly overlapping classification of "horizontal", "vertical", and "centered". For example, an image can be classified as "non-textured", "diagonal", and "horizontal". We use a method in Wang et al. (2001) to classify "textured" images. It has been demonstrated that retrieval performance can be improved for both textured and non-textured images by first classifying them (Wang et al. 2001). The last two classifiers are developed in the current work, with details described below.

A conventional image retrieval system returns images according to visual similarity. However a photographer's intention is more likely to search for pictures by composition rather than by visual details. We therefore integrate composition classification into the SIMPLIcity image retrieval system (Wang et al. 2001) so that retrieved images will tend to have similar composition. Furthermore, we provide the option to rank retrieved images by their aesthetic ratings.

Dataset

The spatial composition classification method is tested on a dataset crawled from photo.net, a photography community where peers can share, rate, and critique photos. These photographs are mostly general-purpose pictures and have a wide range of aesthetic quality. Among the crawled photos, a large proportion have frames which will distort the visual content in image processing and impact analysis results. Therefore we remove frames from the original images in a semi-automatic fashion. The images which contain frames are picked manually and a program is used to remove simple frames with flat tones. Frames embedded with pattern or text usually cannot be correctly removed, and these photos are simply removed from the dataset when we re-check the cropped images in order to make sure the program has correctly removed the frames from images.

We constructed a dataset with 13,302 unframed pictures. Those pictures were then rescaled so that the long dimension of the image has at most 256 pixels. We manually labeled 222 photos, among which 50 are horizontally composed, 51 are vertically composed, 50 are centered, and 71 are diagonally composed. Our classification algorithms are developed and evaluated based on the manually labeled dataset. The entire dataset will be used in system performance evaluation.

"Textured" Vs "Non-Textured" Classifier

We use the "textured" vs. "non-textured" classifier in SIMPLIcity to separate textured images from the rest. The algorithm is motivated by the observation that if pixels in a textured area are clustered using local features, each cluster of pixels yielded will be scattered across the area due to the homogeneity appearance of texture. While for non-textured images, the clusters tend to be clumped. An image is divided evenly into 4×4=16 large blocks. The algorithm calculates the proportion of pixels in each cluster that belong to any of the 16 blocks. If the cluster of pixels is scattered over the whole image, the proportions over the 16 blocks are expected to be roughly uniform. For each cluster, the $\chi 2$ statistic is computed to measure the disparity between the proportions and the uniform distribution over the 16 blocks. The average value of the $\chi 2$ statistics for all the clusters is then thresholded to decide whether an image is textured or not.

Diagonal Element Detection

Diagonal elements are strong compositional constituents. The diagonal rule in photography states that a picture will appear more dynamic if the objects fall or follow a diagonal line. Photographers often use diagonal elements as the visual path to draw viewers' eyes through the image (http://www-.digital-photography-school.com/usingdiagonal-lines-in-photography). By visual path, we mean the path of eye movement when viewing a photograph (Warren 2002). When such a visual path stands out in the picture, it also has the effect of uniting individual parts in a picture. The power of the diagonal lines for composition was exploited very early on by artists. Speed (1972) discussed in great details how Velazquez used the diagonal lines to unite a picture in his painting "The Surrender of Breda."

Because of the importance of diagonal visual paths for composition, we create a spatial composition category for diagonally composed pictures. More specifically, there are two subcategories, diagonal from upper left to bottom right and from upper right to bottom left. We declare the composition of a photo as diagonal if diagonal visual paths exist.

Detecting the exact diagonal visual paths is difficult. Segmented regions or edges provided by the usual image processing techniques often can only serve as ingredients, aka, local patterns, either because of the nature of the picture or the limitation of the processing algorithms. In contrast, an element refers to a global pattern, e.g., a broken straight line (multiple edges) that has presence in a large area of the image plane.

We learned from tutorials and textbooks the following principles, and design accordingly our algorithm for detecting diagonal visual paths. We present some of the principles in the diagonal case, but they apply similarly to other directional visual paths.

Figure 3:
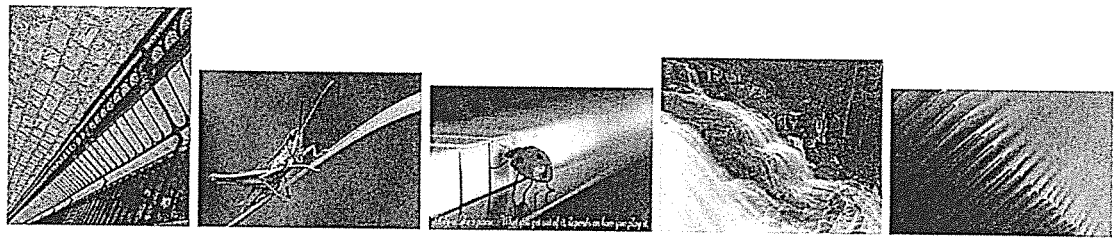
FIG. 3 shows photographs of diagonal composition.

1. Principle of multiple visual types: Lines are effective design elements in creating compositions, but "true" lines rarely exist in real world. Lines we perceive in photographs usually belong to one of these types: outlines of forms; narrow forms; lines of arrangement; and lines of motion or force (Feininger 1973). We do not restrict diagonal elements to actual diagonal lines of an image plane. They could be the boundary of a region, a linear object, and even an imaginary line along which different objects align. Linear objects, such as pathways, waterways, and the contour of a building, can all create visual paths in photographs. When placed diagonally, they are generally perceived as more dynamic and interesting than other compositions. FIG. 3 shows examples of using diagonal compositions in photography.

2. Principle of wholes/Gestalt Law: Gestalt psychologists studied early on the phenomenon of human eyes perceiving visual components as organized patterns or wholes, known as the Gestalt law of organization. According to the Gestalt Law, the factors that aid in human visual perception of forms include Proximity, Similarity, Continuity, Closure and Symmetry (Sternberg et al. 2008).

3. Principle of tolerance: Putting details along diagonals creates more interesting compositions. Visual elements such as lines and regions slightly off the ideal diagonal direction can still be perceived as diagonal and are usually more natural and interesting (http://www.diagonalmethod.info/).

4. Principle of prominence: A photograph can contain many lines, but dominant lines are the most important in regard to the effect of the picture (Folts 2005) (http://www.great-landscapephotography.com/photography-composition.html).

Visual elements need sufficient span along the diagonal direction in order to strike a clear impression.

Following the above principles, we first find diagonal ingredients from low-level visual cues using both regions obtained by segmentation and connected lines obtained by edge detection. Then, we apply the Gestalt Law to merge the ingredients into elements, i.e., more global patterns. The prominence of each merged entity is then assessed. Next, we describe the algorithms for detecting diagonal visual paths using segmented regions and edges respectively.

Diagonal Segment Detection

Image segmentation is often used to simplify the image representation. It can generate semantically meaningful regions that are easier for analysis. This section describes our approach to detecting diagonal visual paths based on segmented regions. We use the recently developed image segmentation algorithm (Li 2011) for it achieves state-of-the-art accuracy at a speed sufficiently fast for real-time systems. The algorithm also ensures that the segmented regions are spatially connected, a desirable trait many algorithms do not possess.

After image segmentation, we find the orientation of each segment, defined as the orientation of the moment axis of the segment. The moment axis is the direction along which the spatial locations of the pixels in the segment have maximum variation. It is the first principal component direction for the data set containing the coordinates of the pixels. For instance, if the segment is an ellipse (possibly tilted), the moment axis is simply the long axis of the ellipse. The orientation of the moment axis of a segmented region measured in degrees is computed according to Russ (2006).

Next, we apply the Gestalt Law to merge certain segmented regions in order to form visual elements. Currently, we only deal with a simple case of disconnected visual path, where the orientations of all the disconnected segments are diagonal.

Let us introduce a few notations before describing the rules for merging. We denote the normalized column vector of the diagonal direction by $v_d$ and that of its orthogonal direction by $v_d^c$. We denote a segmented region by S, which is a set of pixel coordinates $x=(x_h, x_v)^t$. The projection of a pixel with coordinate x onto any direction characterized by its normalized vector v is the inner product $x \cdot v$. The projection of S onto v, denoted by $\mathcal{P}(S, v)$, is a set containing the projected coordinates of all the pixels in S. That is, $\mathcal{P}(S, v) = \{x \cdot v : x \in S\}$. The length (also called spread) of the projection $|\mathcal{P}(S, v)| = \max_{x_i, x_j \in S} |x_i \cdot v - x_j \cdot v|$ is the range of values in the projected set.

The rules for merging, called "Similarity," "Proximity," and "Continuity," are listed below. Two segments satisfying any of the rules are merged.

Similarity: Two segments $S_i$, i=1, 2, with orientations $e_i$, i=1, 2, are similar if the following criteria are satisfied:
1. Let $[\check{\phi}, \hat{\phi}]$ be the range for nearly diagonal orientations. $\check{\phi} \le e_i \le \hat{\phi}$, i=1, 2. That is, both S1 and S2 are nearly diagonal.
2. The orientations of $S_i$, i=1, 2, are close:
$|e_1 - e_2| \le \beta$, where $\beta$ is a pre-chosen threshold.
3. The lengths of $\mathcal{P}(S_i, v_d)$, i=1, 2, are close:

$$r = \frac{|\mathcal{P}(S_1, v_d)|}{|\mathcal{P}(S_2, v_d)|}, r_1 \le r \le r_2,$$

where r1<1 and r2>1 are pre-chosen thresholds.

Proximity: Segments $S_i$, i=1, 2, are proximate if their projections on the diagonal direction, $\mathcal{P}(S_i, v_d)$, i=1, 2, are separated by less than p, and the overlap of their projections is less than q.

Continuity: Segments $S_i$, i=1, 2, are continuous if their projections on the direction orthogonal to the diagonal, $\mathcal{P}(S_i, v_d^c)$, i=1, 2, are overlapped.

We now describe how we choose the various thresholds.
1. $\beta = 10°$.
2. r1=0.8, r2=1.25.
3. The values of p and q are decided adaptively according to the sizes of $S_i$, i=1, 2. Let the spread of $S_i$ along the diagonal line be $\lambda_i = |\mathcal{P}(S_i, v_d)|$. Then p=kp min($\lambda$1,$\lambda$2) and q=kq min ($\lambda$1,$\lambda$2), where kp=0.5 and kq=0.8. The value of p determines the maximum gap allowed between two disconnected segments to continue a visual path. The wider the segments spread over the diagonal line, the more continuity they present to the viewer. Therefore, heuristically, a larger gap is allowed, which is why p increases with the spreads of the segments. On the other hand, q determines the extent of overlap allowed for the two projections. By a similar rationale, q also increases with the spreads. If the projections of the two segments overlap too much, the segments are not merged because the combined spread of the two differs little from the individual spreads.
4. The angular range $[\check{\phi}, \hat{\phi}]$ for nearly diagonal orientations is determined adaptively according to the geometry of the rectangle bounding the image.

Figure 4:
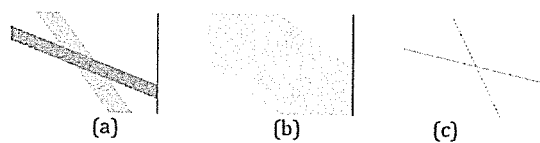
FIG. 4 shows diagonal orientation bounding conditions.

As stated in Lamb et al. (2010), one practical extension of the diagonal rule is to have the objects fall within two boundary lines parallel to the diagonal. These boundary lines are one-third of the perpendicular distance from the diagonal to the opposite vertex of the rectangular photograph. This diagonal stripe area is shown in FIG. 4B. A similar suggestion is made in an online article,[3] where boundary lines are drawn using the so-called sixth points on the borders of the image plane. A sixth point along the horizontal border from the upper left corner locates on the upper border and is away from the corner by one-sixth of the image width. Similarly, we can find other sixth (or third) points from any corner and either horizontally or vertically.

Suppose we look for an approximate range for the diagonal direction going from the upper left corner to the bottom right. The sixth and third points with respect to the two corners are found. As shown in FIG. 4A, these special points are used to create two stripes marked by lime and blue colors respectively. Let the orientations of the lime stripe and the blue stripe in FIG. 4A be $\phi_1$ and $\phi_2$. Then we set $\check{\phi}=\min(\phi_1, \phi_2)$, and $\hat{\phi}=\max(\phi_1, \phi_2)$. A direction $v \in [\check{\phi}, \hat{\phi}]$ is claimed nearly diagonal. Similarly, we can obtain the angular range for the diagonal direction from the upper right corner to the bottom left. The reason to use the orientations of the stripes instead of nearly diagonal bounding lines is that when the width and the height of an image are not equal, the orientation of a stripe will twist toward the elongated side to some extent.

From now on, a segment can be a merged entity of several segments originally given by the segmentation algorithm. For brevity, we still call the merged entity a segment. Applying the principle of tolerance, we filter out a segment from diagonal if its orientation is outside the range $[\check{\phi}, \hat{\phi}]$, the same rule applied to the smaller segments before merging.

After removing non-diagonal segments, at last, we apply the principle of prominence to retain only segments with a significant spread along the diagonal direction. For segment S, if $|\mathcal{P}(S, v_d)| \geq k_l \times l$, where l is the length of the diagonal line and $$k_l = \frac{2}{3}$$

is a threshold, the segment is declared a diagonal visual path. It is observed that a diagonal visual path is often a merged entity of several small segments originally produced by the segmentation algorithm, which are not prominent individually.

Diagonal Edge Detection

According to the principle of multiple visual types, besides segmented regions, lines and edges can also form visual paths. Moreover, segmentation can be unreliable sometimes because over-segmentation and under-segmentation often cause diagonal elements to be missed. We observe that among photographs showing diagonal composition, many contain linear diagonal elements. Those linear diagonal elements usually have salient boundary lines along the diagonal direction, which can be found through edge detection. Therefore we use edges as another visual cue, and combine the results obtained based on both edges and segments to increase the sensitivity of detecting diagonal visual path.

We use the Edison edge detection algorithm (Meer and Georgescu 2001). It has been experimentally demonstrated that Edison edge detection can generate cleaner edge maps than many other methods (Meer and Georgescu 2001). We examine all the edges to find those oriented diagonally and significant enough to be a visual path.

Based on the same set of principles, the whole process of finding diagonal visual paths based on edges is similar to the detection of diagonal segments. The major steps are described below. We denote an edge by E, which is a set of coordinates of pixels located on the edge. As with segments, we use the notation $\mathcal{P}(E, v)$ for the projection of E on a direction v.

Remove non-diagonal edges: First, edges outside the diagonal stripe area, as shown in FIG. 4B, are excluded. Secondly, for every edge E, compute the spread of the projections $s_d = |\mathcal{P}(E, v_d)|$ and $s_o = |\mathcal{P}(E, v_d^c)|$. Recall that $v_d$ is the diagonal direction and $v_d^c$ is its orthogonal direction. Based on the ratio sd/so, we compute an approximation for the orientation of edge E. Edges well aligned with the diagonal line will yield a large value of sd/so, while edges well off the diagonal line will have a small value. We filter out non-diagonal edges by requiring sd/so≥ζ. The choice of ζ will be discussed later.

Merge edges: After removing non-diagonal edges, short edges along the diagonal direction are merged into longer edges. The merging criterion is similar to the proximity rule used for diagonal segments. Two edges are merged if their projections onto the diagonal line are close to each other but not excessively overlapped.

Examine prominence: For edges formed after the merging step, we check their spread along the diagonal direction. An edge E is taken as a diagonal visual element if $|\mathcal{P}(E, v_d)| \geq \xi$, where ξ is a threshold to be described next.

The values of thresholds ζ and ξ are determined by the size of a given image. ζ is used to filter out edges whose orientations are not quite diagonal, and ξ is used to select edges that spread widely along the diagonal line. We use the third points on the borders of the image plane to set bounding conditions. FIG. 4C shows two lines marking the angular range allowed for a nearly diagonal direction from the upper left corner to the lower right corner. Both lines in the figure are of the ideal diagonal direction to some extent. Let ζ1 and ζ2 be their ratios of sd to so, and ξ1 and ξ2 be their spreads over the diagonal line. The width and height of the image are denoted by w and h. By basic geometry, we can calculate ζi and ξi, i=1, 2, using the formulas:

$$\zeta_1 = \frac{h^2 + 3w^2}{2hw}, \zeta_2 = \frac{3h^2 + w^2}{2hw}$$

$$\xi_1 = \frac{h^2 + 3w^2}{3\sqrt{h^2 + w^2}}, \xi_2 = \frac{3h^2 + w^2}{3\sqrt{h^2 + w^2}}.$$

The thresholds are then set by ζ=min(ζ1,ζ2), ξ=min(ξ1, ξ2).

"Horizontal", "Vertical" and "Centered" Composition Types

Now we present our method for differentiating the last three composition categories: "horizontal", "vertical" and "centered." Photographs belonging to each of these categories have distinctive spatial layouts. For instance, a landscape with blue sky at the top and field at the bottom conveys a strong impression of horizontal layout. Images from a particular category usually have some segments that are characteristic of that category, e.g., a segment lying laterally right to left for "horizontal" photographs, and a homogeneous background for "centered" photographs.

In order to quantitatively characterize spatial layout, we define the spatial relational vector (SRV) of a region to specify the geometric relationship between the region and the rest of the image. The spatial layout of the entire image is then represented by the set of SRVs of all the segmented regions. The dissimilarity between spatial layouts of images is computed by the IRM distance (Li et al. 2000). Ideally we want to describe the spatial relationship between each semantically meaningful object and its surrounding space. However, object extraction is inefficient and extremely difficult for photographs in general domain, regions obtained by image segmentation algorithms are used instead as a reasonable approximation. Moreover, for painters, reducing the complicated appearance into simple masses is a necessary step in her composition, and expresses the "essence" of a painting's structure (Speed 1972).

Spatial Relational Vectors (SRV)

The SRV is proposed to characterize the geometric position and the peripheral information about a pixel or a region in the image plane. It is defined at both pixel level and region-level. When computing the pixel-level SRV, the pixel is regarded as the reference point, and all the other pixels are divided into 8 zones by their relative positions to the reference point. If the region that contains the pixel is taken into consideration, SRV is further differentiated into two modified versions, inner SRV and outer SRV. The region-level inner (outer) SRV is obtained by averaging pixel-level inner (outer) SRVs over the region. Details about SRV implementation will be given immediately. As we will see, SRV is scale-invariant, and depends on the spatial position and the shape of the segment.

Figure 5A:
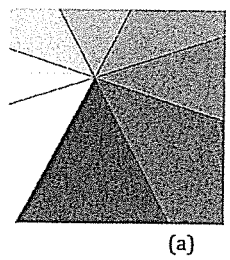
FIGS. 5A and 5B illustrate division of the image into 8 angular areas with respect to a reference pixel.

At a pixel with coordinates (x, y), 4 lines passing through it are drawn. As shown in FIG. 5A, the angles between adjacent lines are equal and stride symmetrically over the vertical, horizontal, 45° and 135° lines. We call the 8 angular areas of the plane "UPPER," "UPPER-LEFT," "LEFT," "BOTTOM-LEFT," "BOTTOM," "BOTTOM-RIGHT," "RIGHT," and "UPPER-RIGHT" zones. The SRV of pixel (x,y) summarizes the angular positions of all the other pixels with respect to (x,y). Specifically, we calculate there are a percentage vi of each zone, i=0, . . . , 7, with respect to the whole image and construct the pixel-level SRV Vx,y by Vx,y=(v0, v1, . . . , v7)t.

Figure 5B:
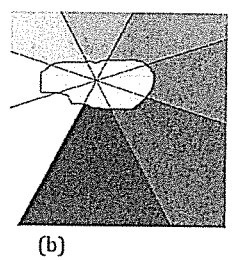

The region-level SRV is defined in two versions called respectively inner SRV, denoted by V', and outer SRV, denoted by V." At any pixel in a region, we can divide the image plane into 8 zones by the above scheme. As shown in FIG. 5B, for each of the 8 zones, some pixels are inside the region and some are outside. Depending on whether a pixel belongs to the region, the 8 zones are further divided into 16 zones. We call those zones within the region as inner pieces and those outside as outer pieces. Area percentages of the inner (or outer) pieces with respect to the area inside (or outside) the region form the inner SRV (or outer SRV) for pixel (x, y).

The region-level SRV is defined as the average of pixel-level SRVs for pixels in that region. The outer SRV $V_R"$ of a region R is $V_R"=\Sigma_{(x,y)\in R} V_{x,y}"/m$, where m is the number of pixels in region R. In practice, to speed up the calculation, we may subsample the pixels (x, y) in R and compute $V_R"$ by averaging over only the sampled pixels. If a region is too small to occupy at least one sampled pixel according to a fixed sampling rate, we will compute $V_R"$ using the pixel at the center of the region.

We use the outer SRV to characterize the spatial relationship of a region with respect to the rest of the image. Then an image with N segments Ri, i=1, . . . , N, can be described by N region-level outer SRVs, $V_{R_i}"$, i=1, . . . , N, together with the area percentages of Ri, denoted by wi. In summary, an image-level SRV descriptor is a set of weighted SRVs: $\{(V_{R_i}", w_i), i=1, \ldots N\}$. We call this descriptor the spatial layout signature.

"Horizontal", "Vertical" and "Centered" Composition Classification

We use k-NN to classify the three composition categories: "horizontal," "vertical" and "centered." Inputs to the k-NN algorithm are the spatial layout signatures of images. The training dataset includes equal number of manually labeled examples in each category. In our experiment, the sample size for each category is 30. The distance between the spatial layout signatures of two images is computed using the IRM distance. The IRM distance is a weighted average of the distances between any pair of SRVs, one in each signature. The weights are assigned in a greedy fashion so that the final weighted average is minimal. Details about IRM are referred to Li et al. (2000); Wang et al. (2001).

Composition Sensitive Image Retrieval

The classic approach taken by many image retrieval systems is to measure the visual similarity based on low-level features. A large family of visual descriptors have been proposed in the past to characterize images from the perspectives of color, texture, shape, etc. However, due to the fact that many visual descriptors are generated by local feature extraction processes, the overall spatial composition of the image is usually lost. In semantic content oriented applications, spatial layout information of an image may not be critical, but for photography, the overall spatial composition can be a major factor affecting how an image is perceived.

For photographers, it can be more interesting to search for photos with similar composition style rather than visual details. We develop algorithms to capture strong compositional elements in photos and classify them into six composition categories, with five main categories namely "textured," "horizontal," "vertical," "centered," and "diagonal," and the "diagonal" category is further subdivided into two categories "diagonal_ulbr" (upper left to bottom right) and "diagonal_urbl" (upper right to bottom left). The composition classification is used in the retrieval system to return images with similar composition.

We use the SIMPLIcity system to retrieve images with similar visual content, and then re-rank the top K images by considering their spatial composition and aesthetic scores. SIMPLIcity is a semantic-sensitive region based image retrieval system. IRM is used to measure visual similarity between images. For a thorough description of algorithms used in SIMPLIcity, readers are referred to Wang et al. (2001), the entire content of which is incorporated herein by reference. In our system, the rank of an image is determined by three factors: visual similarity, spatial composition categorization, and aesthetic score. Since these factors are of different modality, we use a ranking schema rather than a complicated scoring equation.

Given a query, we first retrieve K images through SIMPLIcity, which gives us an initial ranking. When composition is taken into consideration, images with the same composition categorization as the query will be moved to the top of the ranking list.

The composition classification is non-exclusive in the context of image retrieval. For instance, a "textured" image can still be classified into "horizontal", "vertical" or "centered". We code the classification results obtained from the classifiers by a six-dimensional vector c, corresponding to six categories ("diagonal" has two subcategories "diagonal_ulrb" and "diagonal_urbl"). Each dimension records whether the image belongs to a particular category, with 1 being yes and 0 no. Note that an image can belong to multiple classes generated by different classifiers. The image can also be assigned to one or more categories among "horizontal", "vertical" and "centered" if neighbors belonging to the category found by k-NN reach a substantial number (currently k/3 is used). Non-exclusive classification is more robust than exclusive classification in practice because a photograph maybe reasonably assigned to more than one compositional category. Non-exclusive classification can also reduce the negative effect of misclassification into one class. FIG. 6 shows example pictures that are classified as more than one category.

The compositional similarity between the query image and another image can be defined as $$s_i = \Sigma_{k=0}^{3} I(c_{qk}=c_{ik} \text{ and } c_{qk}=1) + 2 \times \Sigma_{k=4}^{5} I(c_{qk}=c_{ik} \text{ and } c_{qk}=1),$$

where cq and ci are categorization vectors for the query image and the other image, and I is the indicator function returning 1 when the input condition is true, 0 otherwise. The last two dimensions of the categorization vector correspond to the two diagonal categories. We multiply the matching function by 2 to encourage matching of diagonal categories in practice. Note that the value of si is between 0 and 6, because one image can at most be classified into 4 categories, which are "textured", "diagonal_ulbr", "diagonal_urbl" and one of the other three. Therefore by adding composition classification results, we divide the K images into 7 groups corresponding to compositional similarity from 0 to 6. The original ranking based on visual similarity remains within each group. When aesthetic rating is further introduced into the ranking schema, images within each group are reordered by aesthetic ratings. Let ri, si and qi denote the rank, compositional similarity, and aesthetic score of image i. The ranking schema can be expressed as:

$$r_i < r_j \begin{cases} s_i > s_j \\ q_i > q_j, s_i = s_j. \end{cases}$$

Figure 7B:
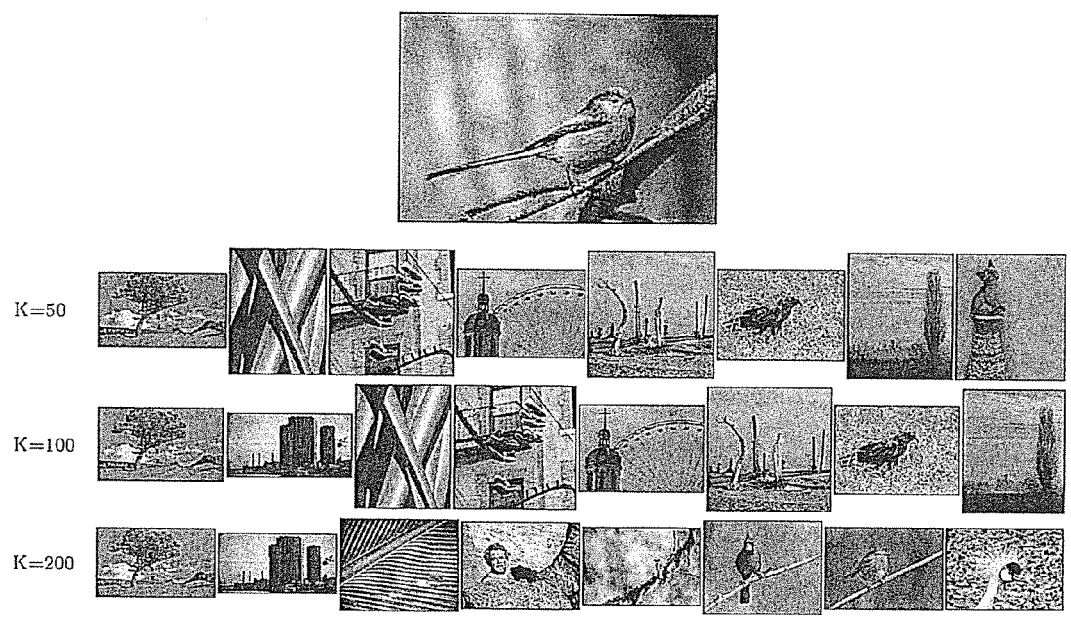

The reason we use such a ranking scheme is that we wish to incorporate three perspectives of different modalities and it is difficult to put these distinct measurements in the same space. Although the composition analysis is performed on the results returned by a CBIR system SIMPLIcity, we can modify the influence of this component in the retrieval process by adjusting the number of images K returned by SIMPLIcity. This provides flexibility for the user to vary her focus on either composition or visual similarity. For example, a large K will retrieve more compositionally relevant photographs, and meanwhile reduce the importance of content similarity. In our experiment, we found that in most cases the retrieved results become stable for our dataset when K>300, a value expected to vary with the size of dataset. In FIG. 7 we provide some examples showing how different values of K can affect the retrieved results.

Color Feedback

Most of the time what people view and perceive from photos is through colors. Although people's feeling about colors may depend on many factors such as context, emotion, culture background, etc., there are some color combinations or arrangements considered to be perceptively stable (Manav 2007; Gao et al. 2007). Experienced photographers can choose specific color combinations to enhance viewers' emotion and to achieve an aesthetically pleasing perception. The study of color and light can be traced back to as early as seventeenth century when Isaac Newton invented the first color wheel. The foundations of modern color theory were laid at the beginning of the twentieth century. Itten (1960) introduced a new color wheel with emphasis on hue information. He proposed several color harmony schemes, such as complementary color harmony, three-color harmony of hues forming an equilateral triangle, four-color harmony of a square, etc., which have been widely adopted by artists and designers. Tokumaru et al. (2002) used 80 color schemes for harmony evaluation and color design and proposed an approach to quantify human's perception and understanding about color combinations. Recently, research efforts have been devoted to improving the visual appeal of an image by enhancing the harmony among colors under an optimization framework (Cohen-Or et al. 2006).

We propose a data driven approach to assess the qualities of color combinations. Our color feedback module can quickly extract the color palette of a photo and tell photographers if these color combinations are aesthetically appealing. The colors are specified completely with hue, saturation intensity, and luminance value rather than only by hue. We first segment each image by a recently developed clustering technique, i.e., hierarchical mode association clustering (HMAC) (Li et al. 2007). Our image segmentation approach consists of the following steps:

(a) Apply k-center algorithm to cluster pixels into a fixed number of groups. This number is significantly larger than the desired number of segments. In particular, we set it to 100. (b) Form a data set $\{x1, \ldots, xn\}$, n=100, where xi is the mean of the vectors assigned to group i by k-center clustering. Assign weight wi to each group i, where wi is the percentage of pixels assigned to that group. (c) Apply HMAC to the data set. Specifically, the kernel density estimator of modal clustering is $f(x)=\Sigma_{i=1}^{n} w_i \phi(x|x_i, D(\sigma^2))$ where σ is the bandwidth of the Gaussian kernel and $D(\sigma2)=\text{diag}(\sigma2, \sigma2, \ldots, \sigma2)$. All the data points that ascend to the same local maximum (mode) of the kernel density function form a cluster. (d) In the dendrogram formed by HMAC, we apply the cluster merging algorithm described in Li et al. (2007). If the number of clusters after merging is smaller than or equal to the given target number of segments, stop and output the clustering results at this level. Otherwise, repeat the merging process at the next higher level of the dendrogram. All the pixels in the same cluster are labeled as one segment.

After segmentation, all the modal vectors are extracted as the representative colors of that image. K-means clustering is another widely used image segmentation method, which clusters the pixels and computes the centroid vectors by minimizing the mean squared distance between the original vectors and the centroid vectors. HMAC, however, uses the modal vectors, at which the kernel density estimator achieves a local maximum. These vectors are peaks of the density function. The representative colors extracted by k-means are often "muddy" due to averaging, while those by modal clustering better retain the true colors. When the number of segments is set to a higher value, the representative colors obtained by modal clustering tend to be more saturated. In particular, we set the target number of clusters to 15, a fairly large value, so that the modal color vectors will not miss any local maximum of the density. If some segment only occupies a small percentage of all the pixels, specifically, less than 5%, its color will be ignored.

After the representative colors are obtained by HMAC, we form color triplets by combining every three distinct colors from that image. For instance, if one image contains n representative colors, there will be n(n−1)(n−2)/6 color triplets (aka combinations). In practice, if there are many colors in one image, we will only consider the representative colors of the five largest segments. We provide feedback in the form of color triplets because the triplet is a good balance for capturing the diversity in color combination and maintaining manageable complexity for human cognition. In fact, in many photography or painting books about color composition, good color schemes are often described by no more than three major hues (a variation range allowed for each hue). Technically, the probability of finding a combination of frequent color quadruplet is lower than finding a frequent color triplet among the highly rated images. To gain high confidence level for a quadruplet, if necessary, a much larger set of high aesthetic quality images are needed.

Let us denote a color triplet $\beta i$ by $(v_i^{(1)}, v_i^{(2)}, v_i^{(2)})$, where $v_i^{(j)}$ is a color vector, j=1, 2, 3. Let $q_i^{(j)}$ be the weight of each color vector $v_i^{(j)}$, i.e., the percentage of occupied pixels by a particular color. $q_i^{(j)}$ is normalized so that $\Sigma_{j=1}^{3} q_i^{(j)} = 1$. The Kantorovich-Mallows distance (Mallows 1972; Levina and Bickel 2001), which takes into account the relative area size covered by each color, is used to compute the distance $D(\beta 1, \beta 2)$ between two color triplets $\beta 1$ and $\beta 2$:

$$D^2(\beta_1, \beta_2) = \min_{w_{i,j}} \sum_{i=1}^{3} \sum_{j=1}^{3} w_{i,j} \|v_1^{(i)} - v_2^{(j)}\|^2 \quad (1)$$

subject to $$\sum_{j=1}^{3} w_{i,j} = q_1^{(i)}, i = 1,2,3; \quad (2)$$

$$\sum_{i=1}^{3} w_{i,j} = q_2^{(i)}, i = 1,2,3;$$

$$w_{i,j} \geq 0, i = 1,2,3, j = 1,2,3.$$

The Kantorovich-Mallows distance has been used in content-based image retrieval, mostly under the name of Earth Mover's Distance (EMD) (Rubner et al. 2000). It was proved by Levina and Bickel (2001) that EMD is equivalent to the Kantorovich-Mallows distance on probability distributions. When measuring texture and color similarities for image retrieval, EMD is more robust than norm distances since it can be applied to variable-length representations of distributions (Rubner et al. 2000).

We use k-NN to evaluate the aesthetic qualities of color combinations. Specifically, we form the training data by collecting all the valid color triplets described above from images with high aesthetic ratings as well as those with low aesthetic ratings. We assume that all the color triplets from high rating images are aesthetically pleasing, which are called highly aesthetic triplets. Given a color triplet from a test image, we first find the top k nearest color triplets in the training data. Then, the percentage of highly aesthetic color triplets are calculated. We refer to this percentage as the ratio statistic of a color triplet, denoted by $\gamma$.

A p-value is defined on the ratio statistics, indicating our confidence about the goodness of a color triplet. Specifically, we first obtain the ratio statistics of all the high aesthetics color triplets from the training data, denoted by $\{\gamma 1, \gamma 2, \ldots, \gamma n\}$, where n is the total number of highly aesthetic triplets. Suppose the ratio statistic of a particular color triplet from a test image is $\gamma$. Its p-value is defined as the percentage of highly aesthetic triplets in the training set whose $\gamma i$'s are larger than $\gamma$, i.e., $\Sigma_{i=1}^{n} I(\gamma_i > \gamma)/n$, where I is an indicator function. If a color triplet's p-value is small, we have strong confidence that it is of high aesthetic quality. To make p-value more straightforward to use, we define a confidence score as $100(1-p)$.

The underlying assumption that all the color combinations from photos with high aesthetic ratings are aesthetically pleasing is debatable. One may argue that a photo may be appealing due to visual qualities other than colors. This concern can be addressed effectively in the future because we are employing the ACQUINE system to collect users' opinions on why a photo is aesthetically appealing; and one choice among many is color scheme. After we have collected sufficient amount of data, we can choose images with high aesthetic scores resulting from colors as our training data. On the other hand, we should be cautious that doing so may restrict our findings about good color schemes to the common knowledge the general public holds.

A viewer may be subconsciously attracted to some color combinations. As a result, she may give the photo high aesthetic rating but not realizing that the colors have played a role. For instance, even painters often do not realize the beauty brought by neutral (aka grays of various hues) colors and the importance of using neutral colors to the advantage. According to Robert Henri, a renowned artist and art educator (Henri 1923), "But even so, there is a power in the palette which is composed of both pure and grave colors that makes it wonderfully practical and which presents possibilities unique to itself. In paintings made with such a palette, if used with great success, we find an astounding result. It is the grave colors, which were so dull on the palette that become the living colors in the picture. The brilliant colors are their foil." Further, Henri mentioned that grave colors "seem to move—rise and fall in their intensity, are in perpetual motion—at least, so affect the eye. They are not fixed. They are indefinable and mysterious."

Aesthetic Feedback

In this section we introduce the component of aesthetic quality feedback on both color and monochromatic images. We assign aesthetic ratings to images on a scale of 0 to 100 based on the models learnt using previously rated images. An on-line demo-version of this component can be found at acquine.alipr.com which derives visual features to quantify the general photography principles and has been discussed in detail by Datta et al. (2006). Our main contribution to this component lies in the addition of a model specific to analyze the aesthetics of monochromatic images. Though the demo is one of its kind to predict the aesthetic ratings reliably in real-time, its accuracy falters in the case of black and white images. This is due to the primary differences in the aesthetic rules of color and monochromatic images.

Unlike the color images whose aesthetics are highly influenced by their color distribution, the black and white images are subtle in their appearance. The black and white images are less distracting than their colored counterparts, they are very simplistic in nature and lay emphasis on the subject. The photographer needs to provide great attention to the image composition and develop emotions though careful manipulation of the tonality in the image. It becomes essential to imply color through contrasts making black and white images more artistic as well as challenging at the same time (Davis 2010). The shape (the two dimensional outline of an object), design and form (the perceived rendering of a three dimensional object in two dimensional space) of the subject gains prominence in black and white images. The subject of the photograph needs to be located on the salient regions in order to attract immediate attention of the viewer. The lighting of the subject, the balance of elements within the image becomes an integral part of its composition.

Some of the well known and famous photographs are actually taken in black and white showing its superiority in aesthetics. To draw the comparison between color and gray scale image aesthetics the FIG. 8 shows a color image of a red tulip, the saturated red of the tulip and its contrasting background makes the image look attractive while the grayscale representation of the same looks much more drab since it lacks contrast and its corresponding aesthetic rating would be low. This is a perfect example which shows the importance of contrast manipulation, choosing a good subject, its lighting, the background color (negative spaces) for a grayscale image. A detailed analysis of aesthetic primitives and their influence can be found in Peters (2007).

Previous works (Datta et al. 2006; Ke 2006; Luo and Tang 2008; Wong and Low 2009) on image aesthetics have developed generic models by using images rated on photo.net, dpchallenge.com or Flickr. Black and white images formed a very small fraction of these datasets. The general population prefers to take photographs in color leaving the black and white images to professionals who take aesthetically pleasing images. The models learnt on such a dataset using data driven approaches will be biased towards assigning black and white images a very high score. This is due to the lack of a uniformly sampled dataset as well as the over simplification of composition rules which plays a very important role in the aesthetics of black and white images. This led us to seek better datasets which show consensus on the ratings and provide wider score range.

We evaluate the visual features extracted to quantify the aesthetics and photo quality by doing a simple classification between images which have high and low ratings using Support Vector Machines (SVM). Having verified our hypothesis on aesthetic rules, we go on to build a regression model using linear regression which can provide a machine generated aesthetic quality rating for any black and white image. We briefly describe the dataset below and go on to provide detailed description of the visual features.

Dataset

To understand the general consensus of general population on the aesthetics of black and white images, we crawled the website of www.dpchallenge.com, a digital photography contest website for the purpose of data collection. Dpchallenge.com hosts contests with specific themes which are open for a limited number of days. The members of this community are expected to vote on at least 20% of the images on the scale of 1-10 for their votes to be counted. This inadvertently leads to a large number of votes per image and the same time introduces noise due to the fatigue of voting a large number of images continuously and due to the users' tendency to assign similar scores to images.

Figure 9D:
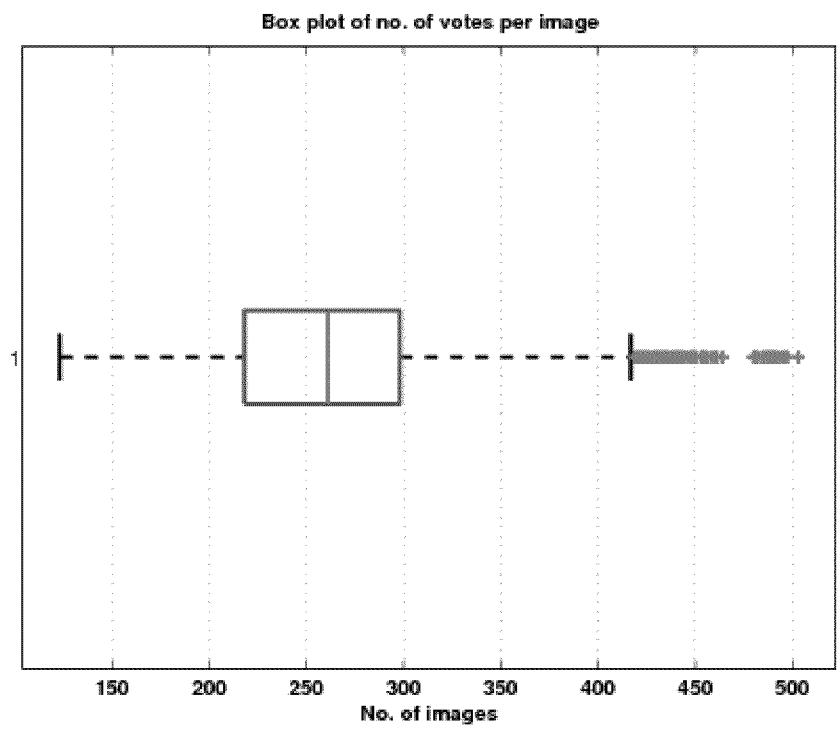
Figure 9E:
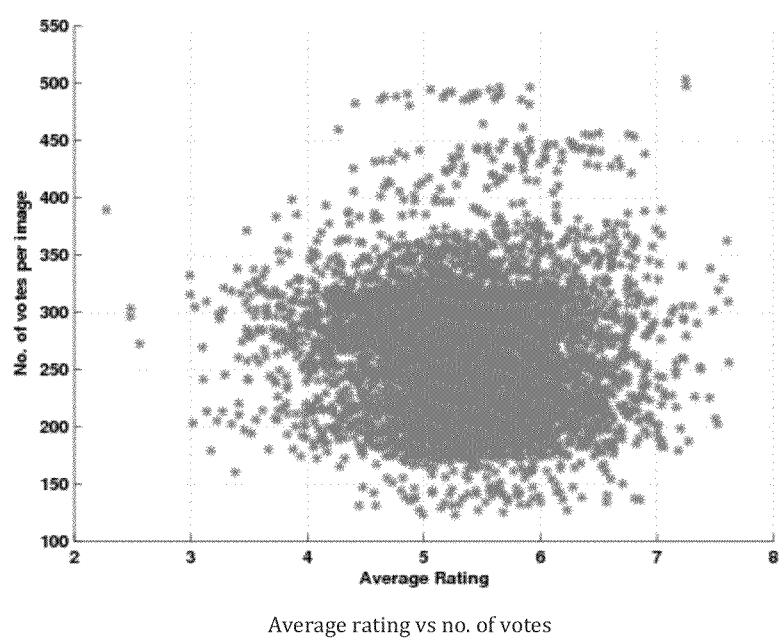

We collected images totaling 8,470 of which 5,790 had ratings. It is observed from our dataset that on an average each image has been rated 262 times with the score range and variance of 5.34 and 0.486 respectively. Some of the sample images from the dataset as well as the score distribution against the number of votes are shown in FIG. 9.

Visual Features for Black and White Images

In addition to adopting a few features from Datta et al. (2006), we developed newer features focused on extracting local contrast, details, shapes and saliency.

Global and Local Sharpness

Sharpness of the image is an indicator of its clarity and detail, in professional photographs one would expect the subject of the photograph to be sharp and most often there is a contrast between the sharpness of the subject and its background leading the viewer's eye on to the subject. Computationally the sharp segments can be detected by the density of the edges and texture content. In order to extract this information we quantify both the local and global sharpness of the image. If the focal length is set to maximum, the entire image will be in focus while setting the focal length to minimum causes the entire image to be out of focus and is aesthetically displeasing which can be captured by the global sharpness measure (Sg). High frequency components indicate the presence of edges and in turn the sharpness. We perform three level Haar Wavelet Transform to extract the high frequency components in each level namely LHi, FILi, HHi where i=1, 2, 3. We store the global sharpness information as $$S_{gi} = \frac{1}{S_i}\left\{\sum_{(x,y)} \|w_i^{hh}\| + \sum_{(x,y)} \|w_i^{hl}\| + \sum_{(x,y)} \|w_i^{lh}\|\right\},$$

where $S_i=|w_i^{hh}|+|w_i^{hl}|+|w_i^{lh}|$ as implemented in Datta et al. (2006).

However in low depth-of-field images, the subject of the photograph might occupy a very small fraction of the image and the global sharpness measure might mislead us to conclude that the image is entirely out of focus. In order to prevent this, we devised a local sharpness measure (S1) which calculates sharpness within the image segments {s1, s2, s3, . . . } of areas {a1, a2, a3, . . . }, generated by the agglomerative segmentation algorithm (Li 2011). Since the number of segments generated by the unsupervised algorithm is uneven, we store the area of the image which has at least 80% of the total sharpness in level three of Haar Wavelet Co-efficients as a feature. We also store the ratio of minimum number of segments which results in 80% of the sharpness in the image, i.e. {Min no. of segments with cumulative sharpness of 80%/total no. segments in the image}. The normalized area and its centroid of the segment with the maximum sharpness are also stored as features.

In addition to these features, we implement another global blur detection algorithm from Tong et al. (2006) and store the blur confidence co-efficient of the image.

Image Tonality and Contrast

As opposed to color images, black and white images do not possess vibrant colors and the photographer must induce various levels of tonality and contrast to the image in order to bring strong emotions, detail and perspective into the picture. In a high-key image, the light tones predominate which depicts emotions of energy, happiness and life while in a low key image the dark tones predominate portraying lifelessness, dullness and a general negativity. Dark blacks, bright whites, subtle shadows, smooth tonal transitions without posterization or noise, highlights that are not blown out are some of the good tonal characteristics of Black and White Images (Suess 1995).

The above characteristics can be captured by carefully studying the image histogram, we split the image histogram into three regions defining low-key region between 0-85, mid-key region between 86-170 and high-key region between 170-256. We analyze these sub-histograms and store their corresponding means and variances which can capture the contrast as well as detect the tonality of the image. FIG. 10 shows examples of low, mid and high key images.

We also store the shortest range and the mean of the histogram which accounts for the 90% of the mass of the image. This feature helps in defining the contrast across the image.

Convex Hull and Normalized Inertia

The shapes and forms are some of the primary composition elements of black and white photographs. Though it is easier to understand and represent shapes, identifying the forms of objects is a very hard problem computationally. We try to approach this problem with the assumption that careful positioning of convex and circular shapes in the image can generate higher aesthetic impact. In order to find the convex shapes in the images we use the feature derived from Datta et al. (2006).

The convexity of the image is represented as the ratio of the area of the convex segments to that of the image area. A segment can be considered convex if its convex hull is closer to its area on the image. Hence the Convex Area=$\Sigma_i I[a_i/\text{convexHull}(s_i)>0.8]a_i$ where si, ai and I are the image segment segment area and the indicator function respectively. The convexity feature is limited by the segmentation algorithm. One of the many reasons we use connectivity constrained agglomerative clustering is to prevent over segmentation of objects in the image. The results presented in Li (2011) shows that the algorithm is able to generate clear segmentation generally without breaking up the object in which case the convexity of the object holds true. On the other hand a convex object could be over segmented into many non-convex and convex segments in which case the convexity of the individual segments do not add up to the convexity of the object, which is an artifact of this feature.

We also describe the circularity of shapes using normalized inertia (Gersho 1979). The discrete form of normalized inertia of order γ for the segment si is represented as $$N(s_i, \gamma) = \frac{\sum_{x \in s_j} \|x - \bar{x}_i\|^\gamma}{a_i^{1+\frac{\gamma}{2}}} \quad (3)$$

Since normalized inertia is invariant to scale and rotational changes, it can be considered as a robust descriptor. Circular shapes achieve the minimum normalized inertia, and hence by calculating the ratio of the normalized inertia of segment to that of a circle, we can infer how close the shape of the segment is to a circle. Let $L(s_i,\gamma)$ be the ratio $N(s_i,\gamma)/Nc(\gamma)$ for the segment si, where $Nc(\gamma)$ is the normalized inertia of a circle for the parameter γ. We calculate $L(s_i,\gamma)$ for γ=1, 2, 3, 4, 5 and store the value $\Sigma_{s_i} L(s_i,\gamma)$ for each order γ as a feature.

Image Salience

Salient regions in the image are the ones which stand apart from the rest due to their contrast, sharpness and edges. It is highly likely that the viewer would focus his/her attention on the salient region before moving on to other parts of the image. Positioning the subject on salient regions and at the same time positioning the salient regions on the thirds of the image leads to better composition.

To capture this information, we extracted the saliency map of the image using the graph based visual saliency (Harel et al. 2007) which generates a soft saliency map, assigning its confidence on each pixel to be salient. We threshold this saliency map at three levels, 75%, 50% and 25% to extract the image regions which are salient and store the normalized area of these regions as well as their centroids to check the rule of thirds. FIG. 11 shows the salient section of the image thresholded at 3 different level.

PhotoQuality—Aspect Ratio and Noise Level

It is known that bad image quality leads to bad aesthetics. We used very intuitive features like the size, aspect ratio of the image and the noise level in the image to quantify photo quality. The size of the image should add to the beauty of the subject in the picture. A well centered symmetric subject is better framed in a square than in a standard rectangular 4:3 frame.

Figure 12:
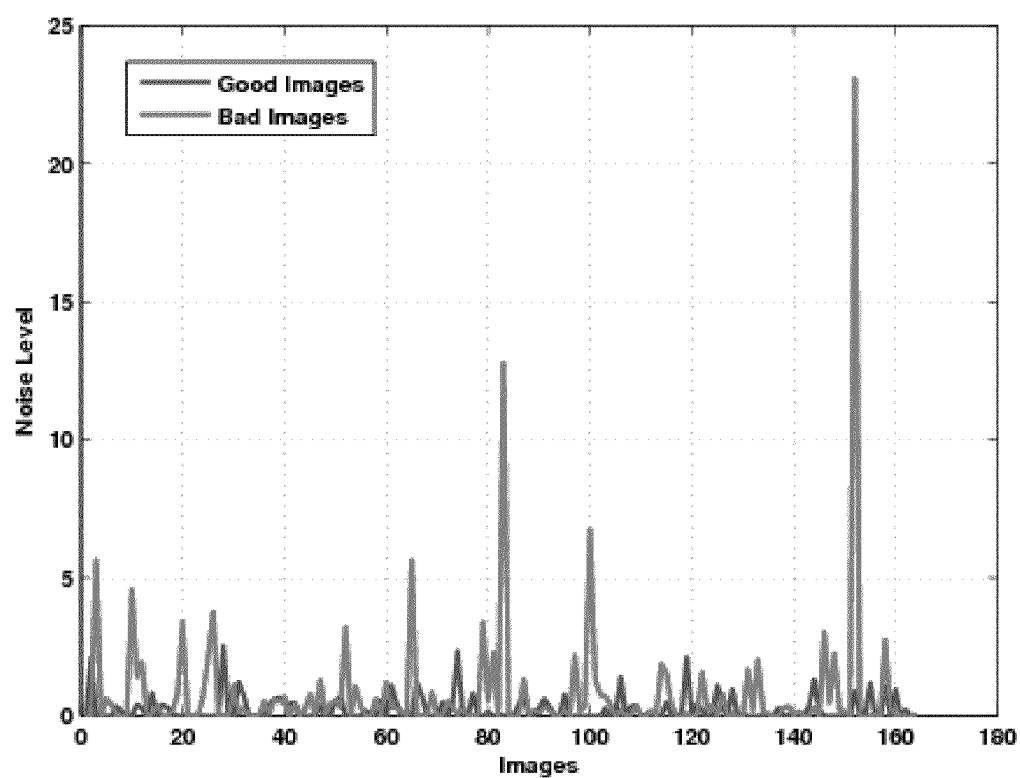
FIG. 12 is a noise level comparison between high and low rated images.

In order to detect sensor noise and noise added by using high ISO settings which leads to grainy images, we use the noise estimation technique developed by Kisilev et al. (2007). The image is divided into blocks of 10×10 and the median absolute deviation from the mean is used to quantize the variance in each of the block. The logic behind this method is to detect the blocks which have the least amount of texture but are inherently noisy at the same time. The mean variance of the top 30 blocks with minimum median absolute deviation is stored as the average noise of the image. FIG. 12 shows the variation in the noise level of low and high rated images.

Experiments

In this section we evaluate individual modules and demonstrate the functions of the OSCAR system. Experimental results for each module will be presented separately. Feedback for example photographs are shown later.

Evaluation of Modules

Our system consists of three modules, namely the composition, color feedback, and aesthetics rating modules. Experiments and discussion for each module are presented below.

Composition Module

The composition module analyzes the compositional properties of a photograph. We apply three classifiers to each image, namely the "textured" vs "non-textured" classifier, the diagonal element detector, and the k-NN classifier for "horizontal," "vertical" and "centered" compositions. The classification can be either exclusive or non-exclusive. We use exclusive classification to evaluate the performance of classifiers, but chose to use non-exclusive classification in the retrieval system. Next we will discuss experimental results in diagonal element detection, and k-NN classification for "horizontal," "vertical," and "centered" classes.

Diagonal Element Detection Algorithms for detecting diagonal element are provided in above. We use both segments and edges as visual cues. After segmentation and edge detection, small segments or edges aligning along the same diagonal direction are merged. These merged segments or edges with wide spread along either of the diagonal lines are marked as diagonal elements. The images which contain diagonal elements are classified into the "diagonal" category.

Figure 13:
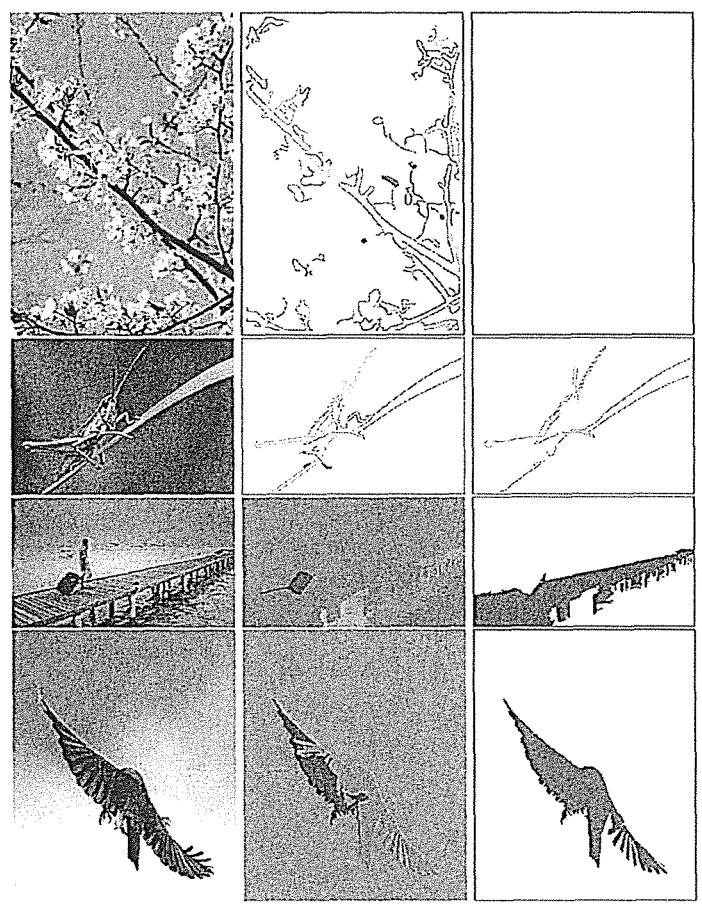
FIG. 13 shows how merging edges or segments form more prominent diagonal elements; the first column shows the original images; the second column shows edge detection or segmentation results; and in the third column, edges or segments are merged and identified as diagonal elements.

FIG. 13 shows some examples for merging segments or edges. Images in the second column show edges and segments generated by edge detection and image segmentation, where disconnected edges or segments are marked by different colors. The third column contains images displaying the detected diagonal elements after merging. In our experiment, we find that merging occurs more frequently with edges than segments. This might be caused due to the fact that the long lines are more likely to be broken into disconnected edges (gaps in edge detection) than elongated regions being divided into several segments.

The current algorithm has some of the following limitations. Firstly, diagonally oriented edges in a noisy context (many other edges in the neighborhood) do not emerge as salient visual elements. Merging edges in a noisy context will lead to false identification of diagonal composition. Secondly, the algorithm only merges diagonally oriented edges or segments. Therefore, it cannot detect more subtle diagonal visual paths formed by edges or segments that are not individually oriented in a diagonal fashion.

Figure 14:
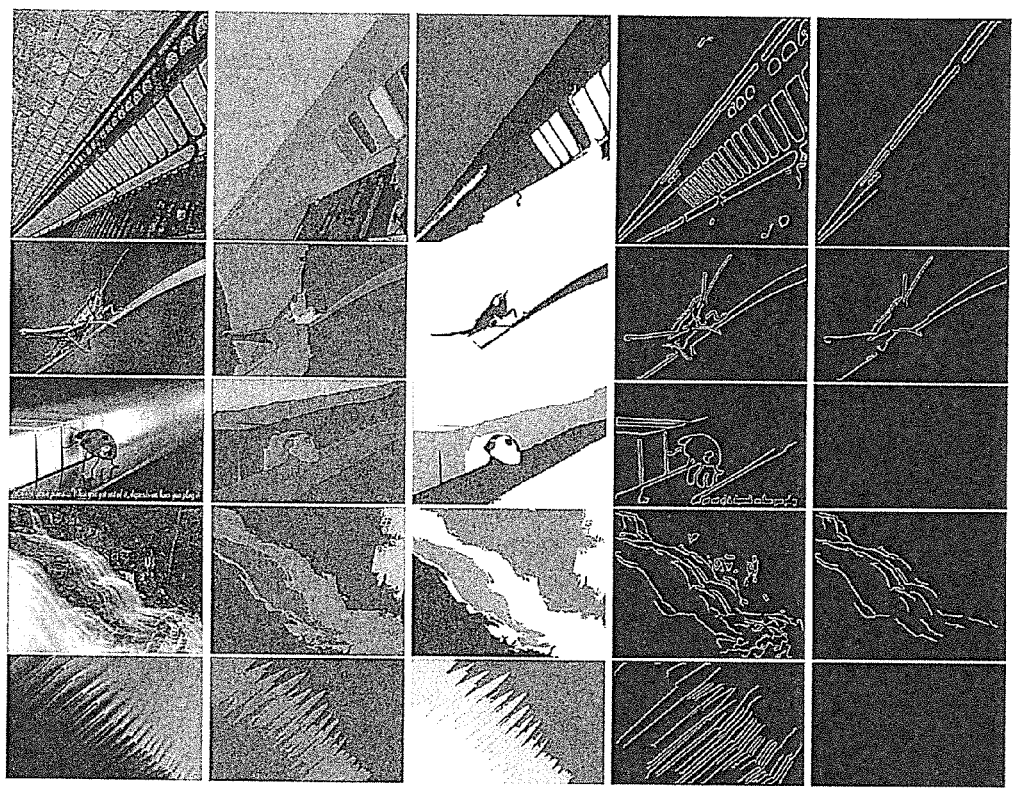
FIG. 14 depicts diagonal element detection. the first column shows the original images; the second column shows the segmentation result; the third column shows the segments detected as diagonal, wherein the white area covers non-diagonal segments; the fourth column shows the edge detection result; and the fifth column depicts the detected diagonal edges.

Some examples of diagonal element detection are given in FIG. 14. Images in the first column are the original pictures. The second column and the third column contain image segmentation and diagonal segment detection results, while the last two columns show the edge detection and diagonal edge detection results. Currently, we only provide information about whether a photograph is diagonally composed or not. The system can be enhanced to take requests as to whether a photograph contains near-diagonal elements so that users can be alerted to adjust the frame to achieve a stronger diagonal composition while taking photographs.

Figure 15A:
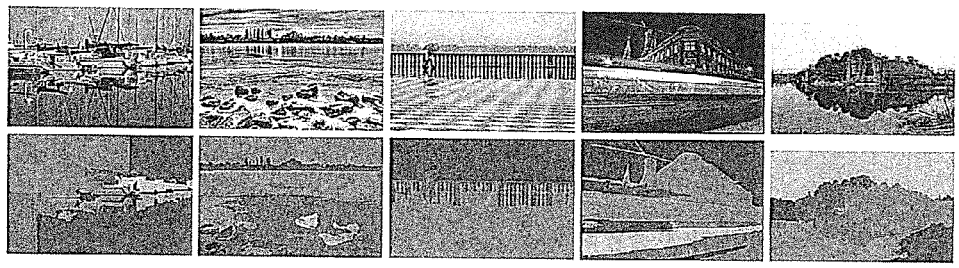
FIGS. 15A-15C are example photos classified as "horizontal," "vertical," and "centered." The first row shows the original images, and the second row shows the segmentation result.
Figure 15B:
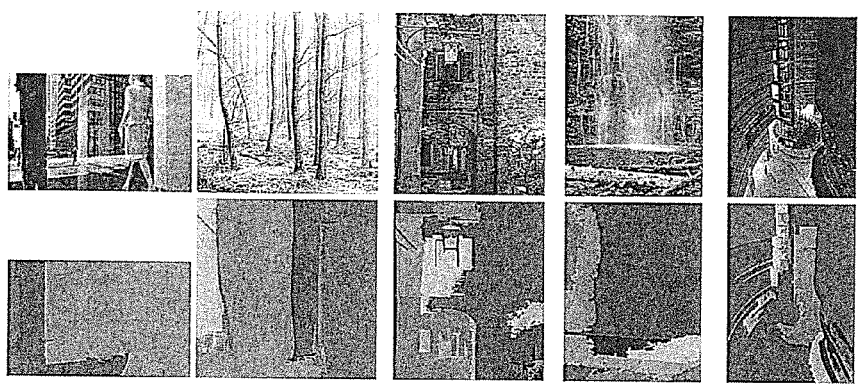
Figure 15C:
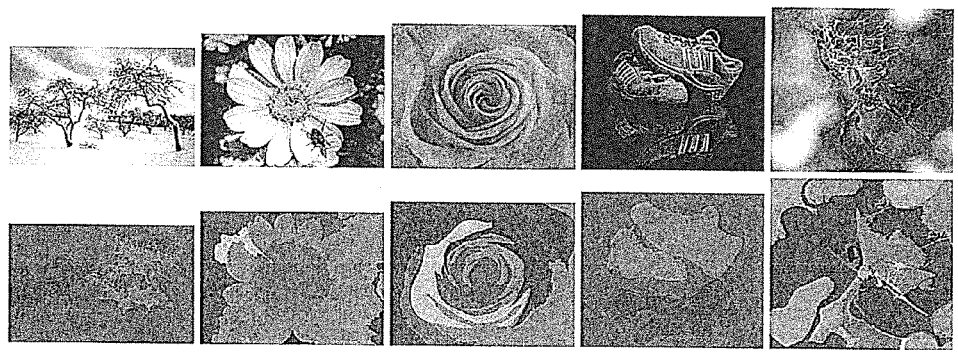

Classification of Spatial Composition Categories "Horizontal," "Vertical" and "Centered" We apply k-NN classification algorithm (k=30) on the spatial layout signatures of images using the IRM distance. In the training dataset, the sample size for each category is 30. FIG. 15 shows example photos classified as "horizontal," "vertical" and "centered" by the k-NN classifier. Misclassification can be caused by a biased training dataset because the image samples in the training dataset may not represent sufficiently the corresponding category. Poor segmentation can also lead to misclassification, since the spatial layout signature is sensitive to the image segmentation results. For example, "centered" photographs can be misclassified if the background is incorrectly broken into multiple segments. We notice that the spatial layout signature of a "centered" photo distinguishes itself clearly from "horizontal" and "vertical" signatures when the centered segment, usually the subject, fills a major portion of the image plane. It can also occur when the background segment takes up a major portion of the image plane or when the segments on the boundary region are evenly distributed.

Confusion Table

In order to evaluate the performance of our composition classification algorithms, we apply the three classifiers on 222 manually labeled photographs, among which 50 are horizontally composed, 51 are vertically composed, 50 are centered, and 71 are diagonally composed (35 have visual elements along the diagonal line from the upper left corner to the bottom right corner, and 36 have diagonal elements in the other direction). Images in the testing dataset are pictures which have composition clarity and fit into single category.

TABLE I

Confusion table for composition classification on 222 images from five categories

|  | h | v | c | ulbr | urbl |
|---|---|---|---|---|---|
| h | 44 | 0 | 0 | 3 | 3 |
| v | 0 | 34 | 7 | 8 | 2 |
| c | 6 | 3 | 29 | 5 | 7 |
| ulbr | 0 | 1 | 2 | 30 | 2 |
| urbl | 0 | 3 | 0 | 0 | 33 |

In this experiment, we will perform an exclusive classification. The classifiers are applied on an image sequentially. That is, we first use the "textured" vs "non-textured" classifier to determine whether the image looks "textured". If this classifier labels it "non-textured", the diagonal element detector is then applied. Provided any diagonal element is detected, the image is assigned to one of the diagonal categories according to its orientation. If the category of the image is still undetermined, the k-NN classifier finally decides its composition type by classifying it under the category which gets the most votes. We only evaluate the diagonal detector and k-NN classifier for "horizontal," "vertical" and "centered." We denote these categories by "h" for "horizontal," "v" for "vertical," "c" for "centered," "ulbr" for diagonal direction from the upper left corner to the bottom right corner, and "urbl" for the other. Table I gives the confusion table for this testing dataset. More results and discussion on composition classification are provided herein.

Color Feedback Evaluation

Figure 16A:
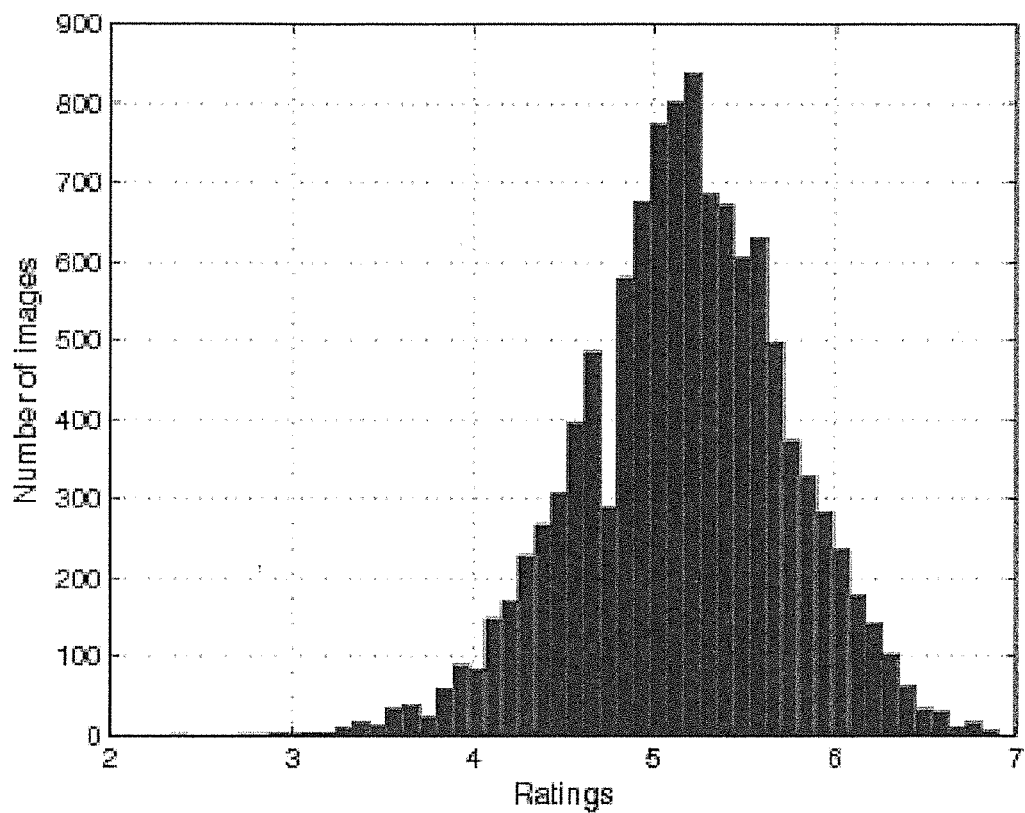
FIG. 16A is a graph that shows the distribution of image ratings.

Our color feedback module is evaluated on the same dataset used herein except with all the gray scale images removed. In total, there are 11,241 images, with ratings between 2.33 and 6.90 (out of 7.00). The distribution of these ratings is shown in FIG. 16A. Images with high aesthetic ratings are generally of high quality. For training, we randomly select half of the images with top 5% ratings and half of the images with bottom 5% ratings. HMAC (Li et al. 2007) is used to segment these images. As mentioned above, the target number of clusters in HMAC is set to 15, and we extract the 5 most dominant colors from that image if it has more than 5 colors. Then in each image, every three distinct colors form a color triplet, or color combination. The images with fewer than 3 colors will be excluded. All the color triplets from images with top ratings are supposed to have good aesthetics, and are called the highly aesthetic triplets. At the end, we obtain a training dataset containing 1,794 highly aesthetic color triplets and 1,890 triplets from low rating images. K-NN is used to calculate the ratio statistics of color triplets, with k equal to 120.

Figure 16B:
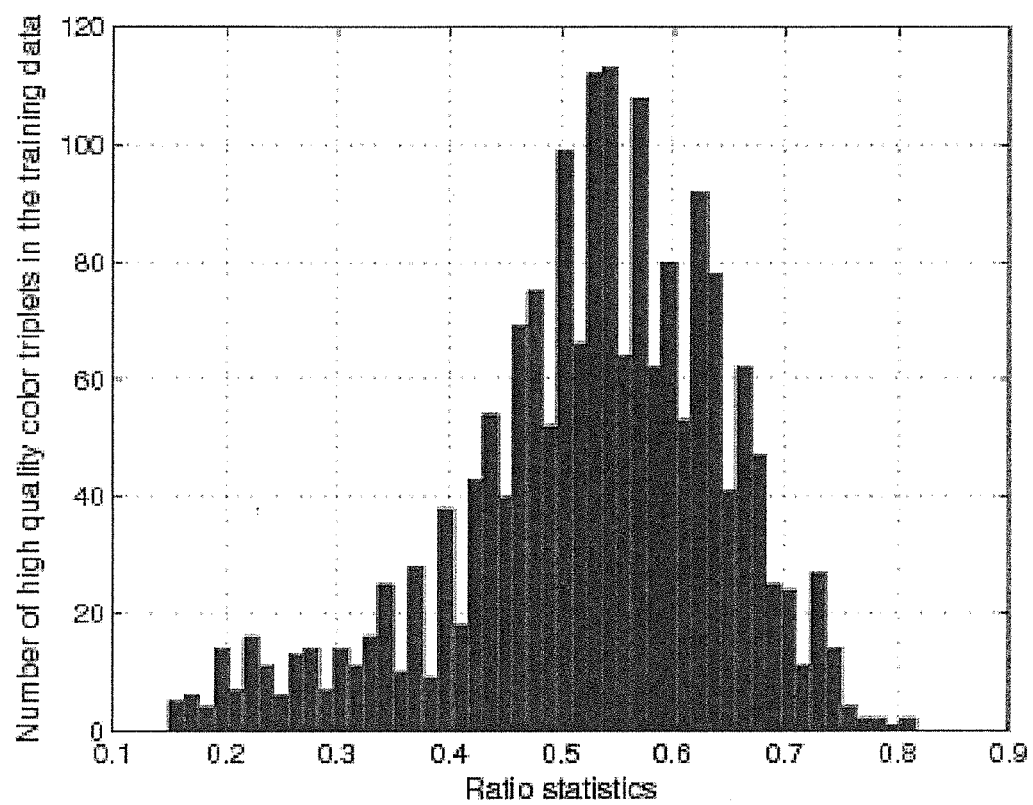
FIG. 16B is a graph that shows the distribution of ratio statistics for all the high aesthetics color triplets in the training data.
Figure 16C:
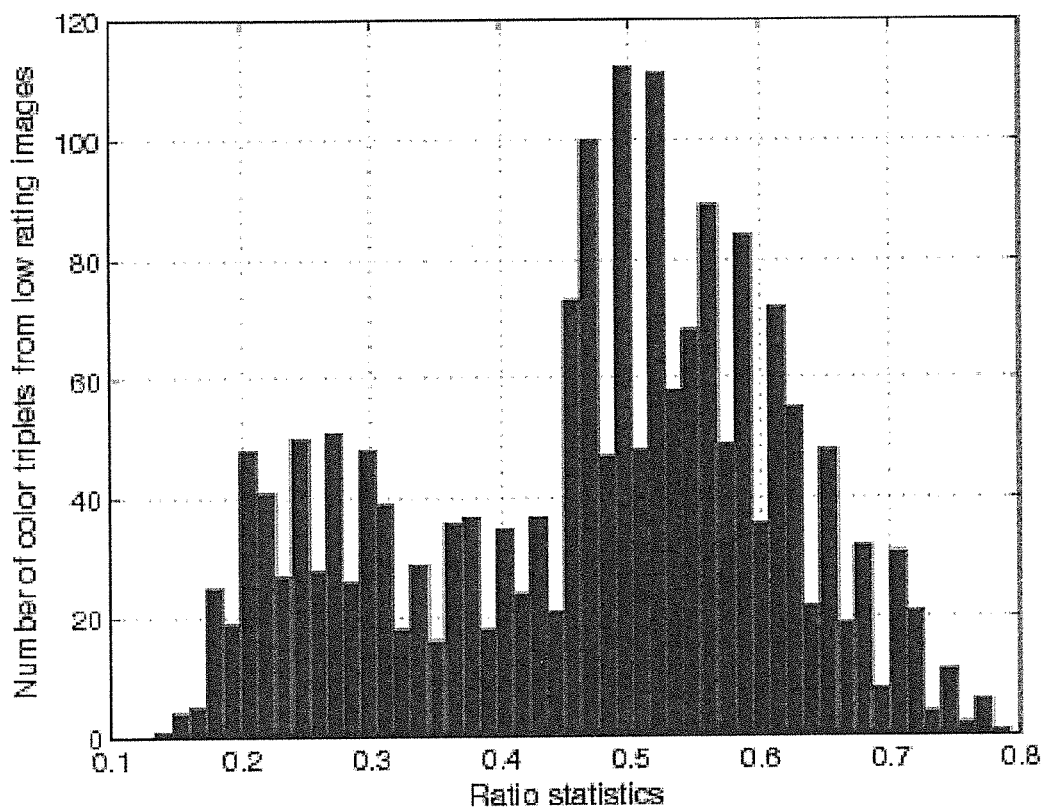
FIG. 16C is a graph that shows the distribution of ratio statistics for color triplets from low rating in the training data.
Figure 17:
FIG. 17 illustrates top 20 highly ranked color triplets and the corresponding images.

We first obtain all the ratio statistics of highly aesthetic color triplets as well as the triplets from low rating images, the histograms of which are shown in FIGS. 16B and 16C. Note that the distribution in FIG. 16C has two modes, which may indicate that though low rating images are more likely to have color triplets of low aesthetic quality, they may also contain certain good color triplets. Then we calculate all the confidence scores of the color triplets from high quality images in the training data. The larger the score, the more confidence we have to claim a particular color triplet to be aesthetically pleasing. The color triplet with the largest confidence score within each image is selected, i.e., the one with the highest aesthetics. Then we rank these selected color triplets based on their confidence scores, the one with the largest score on the top. FIG. 17 shows the top 20 highly ranked color triplets. Among those color triplets, a few contain colors that have nearly the same hue. The majority of the color triplets contain colors similar in hue. And yet a few triplets contain complementary colors with one hue occupying two colors with different luminance. There is a possibility that a region with smooth while large tone transition in the image is over segmented. On the other hand, purely from the perspective of studying color, it can be useful to divide colors of similar hues but very different tones (i.e. light intensity) into separate regions. Variation in tone but not hue impacts human perception deeply. In art books, artists are often reminded that getting the tone right is more important than getting the color hue right because the viewer's impression of the three dimensional world relies largely on the correct relationship in tone rather than in hue. A picture that conveys a strong sense of three dimensions, let it be a painting or a photograph, is usually appealing. In the case of paintings, such works are often marveled at. Additionally, the color triplets found in FIG. 17 are not highly saturated, which may be a reflection of Robert Henri's remarks about the attractiveness of grave colors in pictures (Henri 1923).

Figure 18A:
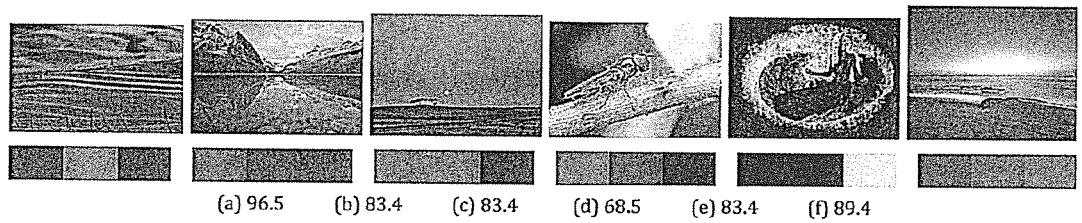
FIGS. 18A-18C show the most aesthetically pleasing color triplets and their confidence scores from images of different ratings—(a) to (t) have ratings between 89.71 and 97.29 (high), (g) to (l) between 70.00 and 84.86 (middle), and (m) to (r) between 20.00 and 55.14 (low). The ratings are scaled from (0, 7) (ratings from photo.net) to (0, 100)
Figure 18B:
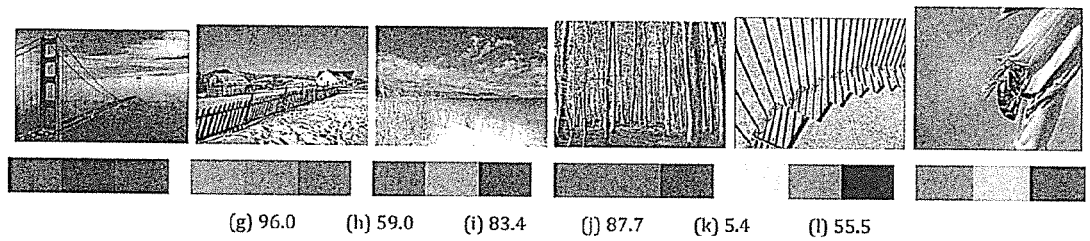
Figure 18C:
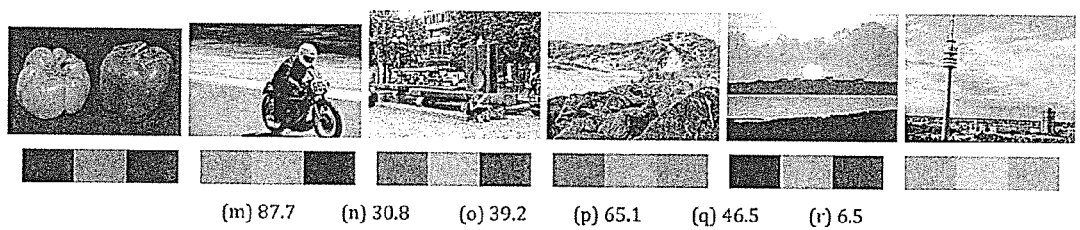

We randomly select several images with high, middle, and low ratings, and evaluate the aesthetic qualities of their color combinations using our color feedback module. The color triplet from each image with the largest confidence scores, presumably most aesthetically pleasing color combination, are shown in FIG. 18. The number under each image is the corresponding confidence score of the best color triplet chosen. Images with high, middle, and low ratings are shown in the first, second and third row, respectively. As we can see, the most aesthetically pleasing color triplets from images with high and middle ratings usually have larger confidence scores. This indicates that we are more confident about the aesthetic appeal of these color combinations. However, note that the largest confidence scores of color triplets from FIG. 18D and FIG. 18K are 68.5 and 5.4, although these two images receive good ratings. This may indicate that viewers are attracted to these photos by aspects other than color. On the other hand, even though FIG. 18M has a low rating, it includes a color combination with confidence score as large as 87.7.

Black and White Aesthetics Rating

In order to verify the discriminative power of our features we performed classification between images with high and low aesthetic ratings. In order to clearly demarcate the images which have higher aesthetics from the ones with lower aesthetics, we group images above a given threshold as good images and the images below a threshold as bad images. These thresholds are varied to check for classifier performance and robustness. We grouped images with average aesthetic ratings above two thresholds 6 and 6.5 as pleasing while the images with average ratings lower than 5 and 4 as images with bad aesthetic quality.

We extract features detailed above from images conforming to the thresholds mentioned above and perform classification using Support Vector Machines. The R implementation of "kernlab" (Karatzoglou 2004) which has an in-built automatic kernel parameter optimizer was used. Table II shows the classification results, the average accuracy with and without dimensionality reduction using Principal Component Analysis (PCA) over fivefold cross validation. The results shown utilize the best regularization parameter in each experiment. Since the PCA resulted in a significant reduction in accuracy, we chose to perform all the experiments with the entire feature set.

Figure 19:
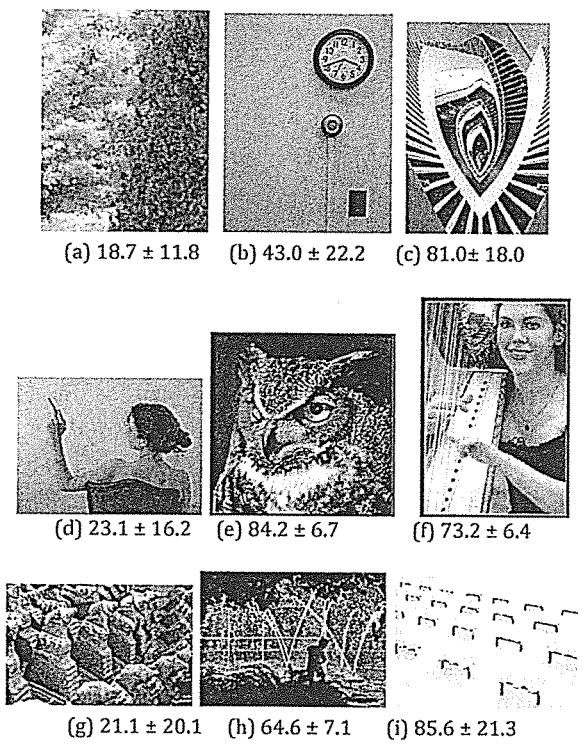
FIG. 19 provides exemplar images with aesthetic ratings and confidence levels predicted by the invention.

Knowing the features are fairly discriminative a regression analysis was performed. The regression model is likely to be unbiased when the data is uniformly distributed across ratings on the contrary a skewed distribution might bias it assign mean scores very frequently. We divided the dataset into separate test and training set, the training set was created by uniformly sampling 1800 images across the ratings and the rest was used as a test set. A regression model using independent polynomials $$f, f^{\frac{1}{3}}, f^{\frac{2}{3}}, f^2$$

was constructed, each polynomial represents the features. Linear regression was preferred to Support Vector Regression in order to avoid over fitting. The Mean of Squared Error (MSE) for the predicted ratings was found to be 0.5916. The co-efficient of determination R2 determined by Equation 4 where $\hat{y}$ is the predicted value from the regression and $\bar{y}$, the average score of the training images was found to be 0.4272. R2 determines the amount of variability in the data which the model is able to predict, representing the goodness of fit. In order to provide ratings which are consistent with our previous system ACQUINE, the model was later retrained with the average ratings scaled between 1-100. Some of the images with aesthetic quality ratings along with their confidence intervals with 95% confidence level are shown in FIG. 19. The confidence interval of the predicted value is given by $\hat{y} \pm t^* s_{\hat{y}}$, where $t^*$ is the upper 0.025 p-value for the t-distribution of the dataset. We have used the linear regression toolbox in R to generate the confidence interval. We can infer that a wider confidence interval implies higher uncertainty in the aesthetic quality of the image.

TABLE II

Classification accuracy of images with high aesthetic ratings and low aesthetic ratings obtained by various thresholds

| Thresholds | No. of images | Without PCA | With PCA |
|---|---|---|---|
| 4≥ & ≤6.5 | 452 | 0.812 | 0.768 |
| 4≥ & ≤6 | 1143 | 0.891 | 0.889 |
| 5≥ & ≤6 | 2638 | 0.703 | 0.702 |

$$R^2 = 1 - \frac{\sum_i (y_i - \hat{y})^2}{\sum_i (y_i - \bar{y})^2} \quad (4)$$

Figure 20:
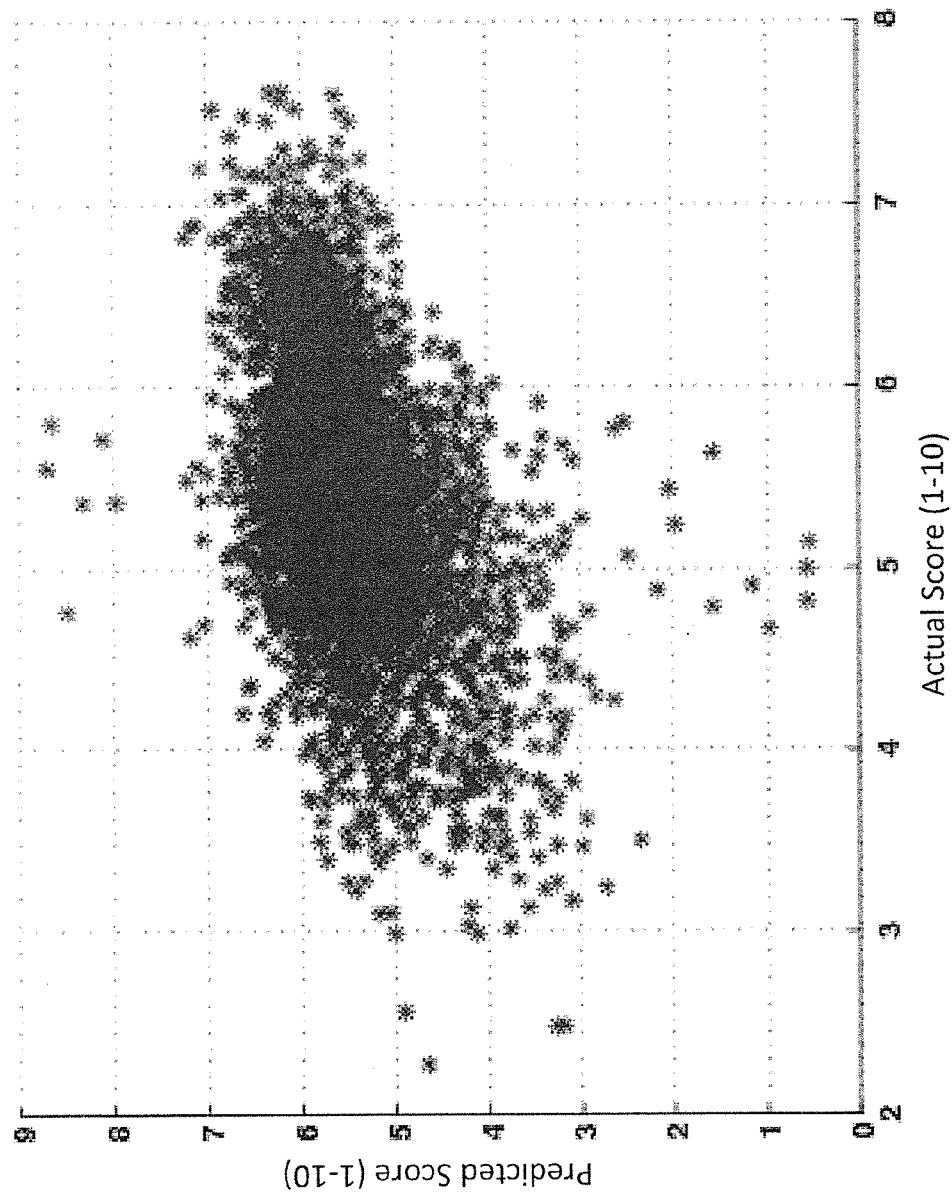
FIG. 20 is a scatter plot of predicted ratings by our model and the actual ratings.

Any literature so far has dealt with generic models of image aesthetics alone. Due to the absence of previous works on gray scale image aesthetics or any standard dataset which can be used for evaluation and comparison we have evaluated our model over a separate test set extracted from dpchallenge.com. The test set consisted of about 4500 images. The Scatterplot in FIG. 20 shows the predicted ratings provided by our gray scale model with the actual ratings obtained from the website. The mean squared error for the test set was found to be 0.5583.

Composition Feedback Examples

The above modules are integrated into the OSCAR system to provide users with feedback on each aesthetics component. Feedback is provided in the form of retrieved photographs, most aesthetically pleasing color triples and their confidence values (only for color images), and aesthetic scores for both color and gray-scale images. Similar photographs can be retrieved from the server based on visual similarity, composition categorization and aesthetic scores. The system is able to assist users with automatic composition analysis and color evaluation. The aesthetic ratings give an assessment of the photo quality in terms of general features.

Figure 21:
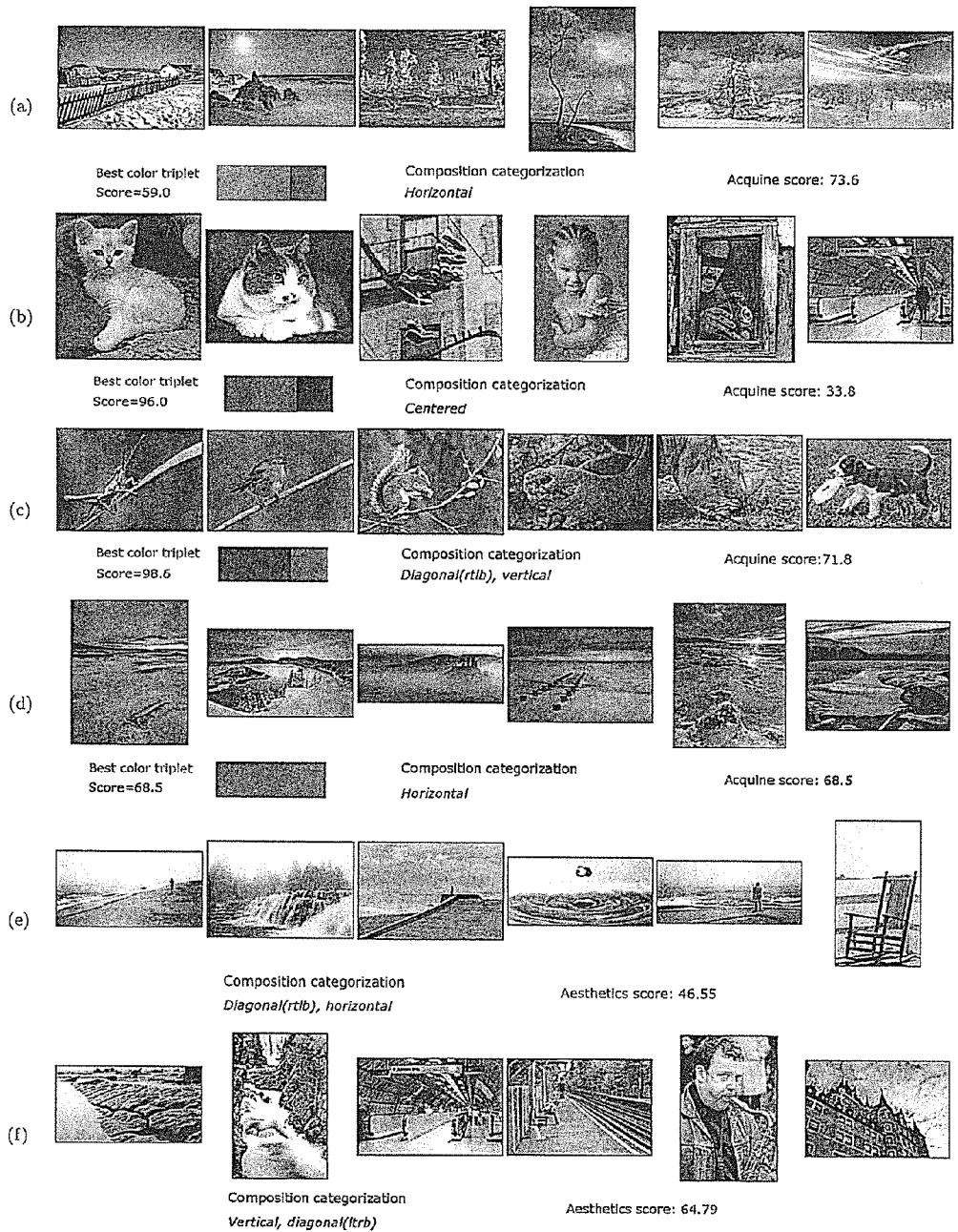
FIG. 21 depicts composition feedback. The photographs are re-ranked by composition categorization and aesthetic score. Also shown are the most aesthetically pleasing color triplets (only for color images) along with confidence score, composition categorization result and aesthetic score.
Figure 22:
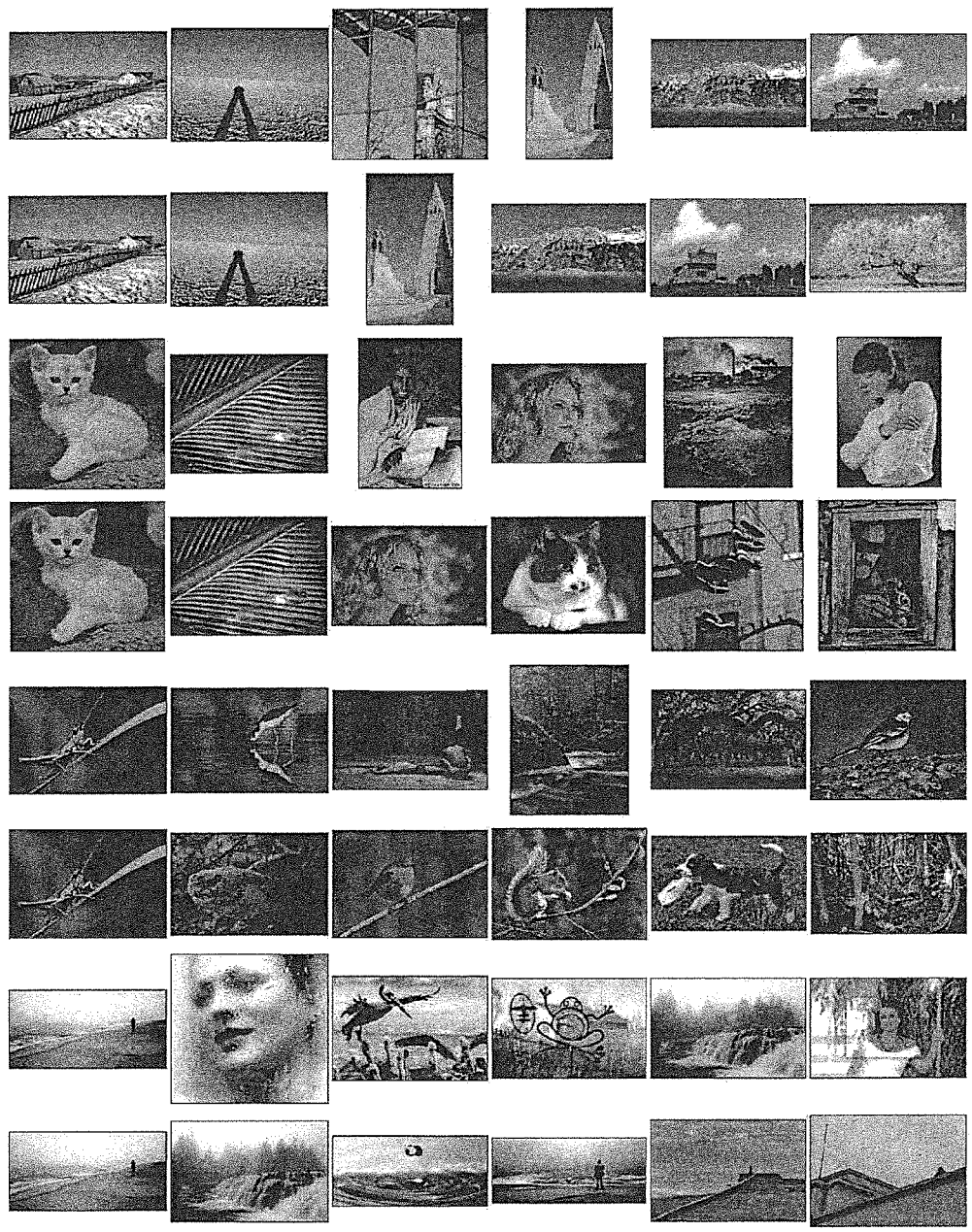
FIG. 22 shows photographs retrieved from the database. The photos above are ranked by visual similarity; the photos below are re-ranked by composition categorization.

We use the SIMPLIcity system to obtain the original ranking of images according to their visual similarity with the query image, and return K=100 top ranked pictures. When users choose to re-rank the images by composition or rating, the system re-ranks these K images using the schema provided in above. FIG. 21 presents 6 query examples including 4 color images and 2 gray-scale image. The photographs retrieved from the database are re-ranked by composition categories and aesthetic scores. The feedback also includes the best color triplets and their confidence scores, the composition categorization result, and machine generated aesthetic scores. ACQUINE system provides aesthetic scores for color images and the black and white aesthetics model introduced in this paper estimates aesthetic scores for gray scale images. Composition sensitive retrieval results and the original image ranking by SIMPLIcity for the same set of images are provided in FIG. 22. We can see that introducing composition categorization lowers the ranks of compositionally irrelevant images, and returns more interesting pictures.

User Study and Evaluation

Here we investigate the usefulness of OSCAR for the users to take better photographs. Professional photographers would be ideal subjects for our user studies. However, due to time constraints, we could not invite sufficient number of professionals to participate. We finally recruited around 30 students, most of whom are graduate students at Penn State with a fair knowledge of digital images and photography. We expect to collect more feedbacks from skilled photographers in the future to improve the system. The entire demo system will be made available for public use when this work has been published. In total, three user studies have been conducted. All the photos used in these studies are from photo.net, the same collection used in our experiments. The detailed design and the evaluation of each user study are reported as follows.

User Perception on Composition Layout

A collection of around 1000 images were randomly picked to form the dataset for the study on composition. Each participant is provided with a set of 160 randomly chosen images and is asked to describe the composition layout of each image. At an online site, the participants can view pages of test images, beside each of which are selection buttons for seven composition categories: "Horizontal," "Vertical," "Centered," "Diagonal (upper left, bottom right)," "Diagonal (upper right, bottom left)," "Patterned," and "None of Above." Multiple choices are allowed. We used "Patterned" for the class of photos with homogeneous texture (the so called "Textured" class). We added the "None of Above" category to allow more flexibility for the user perception. At the end, we were able to collect 924 images that were voted by three or more users.

Variation in Users' Choices of Composition

TABLE III

Distribution of the entropy for the votes of users. For each composition category, the percentage of photos yielding a value of entropy in any bin is shown.

|  | [0, 0.5] | (0.5, 1.0] | (1.0, 1.5] | (1.5, 2.0] | (2.0, 2.5] |
|---|---|---|---|---|---|
| h | 36.12 | 29.96 | 17.18 | 15.42 | 1.32 |
| v | 12.98 | 45.67 | 19.71 | 20.19 | 1.44 |
| c | 25.36 | 45.48 | 13.12 | 14.87 | 1.17 |
| ulbr | 12.99 | 44.16 | 19.48 | 19.48 | 3.90 |
| urbl | 16.87 | 43.37 | 18.07 | 20.48 | 1.20 |
| t | 10.77 | 36.92 | 10.77 | 36.92 | 4.62 |
| none | 6.59 | 39.56 | 17.58 | 34.07 | 2.20 |

In order to understand compositional clarity, we examine the variation in users' votes on composition layout. We quantify the ambiguity in the choices of composition layout using entropy. The larger the entropy in the votes, the higher is the ambiguity in the compositional layout of the image. The entropy is calculated by the formula $\Sigma p_i \log 1/p_i$, where pi, i=0, . . . , 6, is the percentage of votes for each category. The entropy was calculated for all 924 photos and its value was found to range between 0 and 2.5. We divided the range of entropy into five bins. The photos are divided into seven groups according to the composition category receiving the most votes. In each category, we compute the proportion of photos yielding a value of entropy belonging to any of the five bins. These proportions are reported in Table III. We observe that among the seven categories, "Horizontal" and "Centered" have the strongest consensus among users, while "None of above" is the most ambiguous category.

Composition Classification Results

We evaluate our composition classification method in the case of both exclusive classification and non-exclusive classification. The users' votes on composition are used to form ground truth, with specifics to be explained shortly. We consider only six categories, i.e. "Horizontal," "Vertical," "Centered," "Diagonal_ulbr," "Diagonal_urbl" and "Textured" for this analysis. The "None of above" category was excluded for the following reasons. The "None of above" category is of great ambiguity among users, as shown by the above analysis.

TABLE IV

Confusion table for exclusive classification of 494 images into six composition categories. Each row corresponds to a ground truth class.

|  | h | v | c | ulbr | urbl | t |
|---|---|---|---|---|---|---|
| h | 107 | 0 | 20 | 3 | 8 | 4 |
| v | 1 | 32 | 39 | 3 | 2 | 10 |
| c | 10 | 7 | 132 | 8 | 11 | 12 |
| ulbr | 4 | 0 | 5 | 18 | 0 | 2 |
| urbl | 2 | 1 | 13 | 0 | 22 | 1 |
| t | 0 | 2 | 6 | 0 | 0 | 9 |

Only a very small portion of images are predominantly labeled as "None of above." Among the 924 photos, 17 have three or more votes on "None of above."

We notice that these 17 "None of above" photos vary greatly in visual appearance; and hence it is not meaningful to treat such a category as a compositionally coherent group. It is difficult to define such a category. A portion of images in this category show noisy scenes without focused objects, which may become a new category to be considered in our future work.

We conducted exclusive classification only on photos of little ambiguity according to users' choices of composition. The number of votes a category can receive ranges from zero to five. To be included in this analysis, a photo has to receive three or more votes for one category (that is, the ground-truth category) and no more than one vote for any other category. With this constraint, 494 images out of the 924 are selected. Table IV is the confusion table based on this set of photos.

Figure 23A:
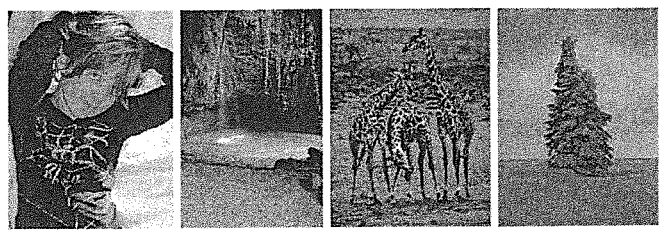
FIGS. 23A and 23B show photo examples mistakenly classified as "Centered" by the system.
Figure 23B:

We see that the most confusing category pairs are "Vertical" vs "Centered" and "Diagonal_urbl" vs "Centered." FIG. 23A shows some examples labeled "Vertical" by users while classified as "Centered" by our algorithm. We observe that the misclassification is mainly caused by the following: 1) "Vertical" images in the training dataset cannot sufficiently represent this category; 2) users are prone to label images with vertically elongated objects "Vertical" although such images may be "Centered" in the training data; 3) the vertical elements fail to be captured by image segmentation. FIG. 23B gives "Diagonal_urbl" examples mistakenly classified as "Centered". The failure to detect diagonal elements results mainly from: 1) diagonal elements which are beyond the diagonal tolerance set by our algorithm; 2) imaginary diagonal visual paths, for example, the direction of an object's movement.

In non-exclusive classification, the criterion for a photo being assigned to one category is less strict than in the exclusive case. A photo is labeled as a particular category if it gets two or more votes on that category.

In total there are 849 out of the 924 photos with at least one category voted twice or more. The results reported below are based on these 849 photos.

The composition categorization of a photo is represented by a six-dimensional binary vector, with 1 indicating the presence of a composition type, and 0 the absence. Let $M=(m0, \ldots, m5)$ and $U=(u0, \ldots, u5)$ denote the categorization vector generated by our algorithm and by users respectively. The value m0 is set to 1 if and only if there are 10 or more nearest neighbors (among 30) labeled as "Horizontal". The values of m1 and m2, corresponding to the "Vertical" and "Centered" categories, are set similarly. For the diagonal categories, mi, where i=3, 4, is set to 1 if any diagonal element is detected by our algorithm. Finally, m5 is set to 1 if the "Textured" versus "Non-textured" classifier labels the image "Textured." Three ratios are computed to assess the accuracy of the non-exclusive classification.

Ratio of partial detection r1: the percentage of photos for which at least one of the user labeled categories is declared by the algorithm. Based on the 849 photos, r1=80.31%.

Detection ratio r2: the percentage of photos for which all the user labeled categories are captured by the algorithm. Define $M \succ U$ if $m_j \geq u_j$ for any $j \in [0, 5]$. So r2 is the percentage of images for which $M \succ U$. We have r2=66.00%.

Ratio of perfect match r3: the percentage of photos for which M=U. We have r3=33.11%.

Figure 24:
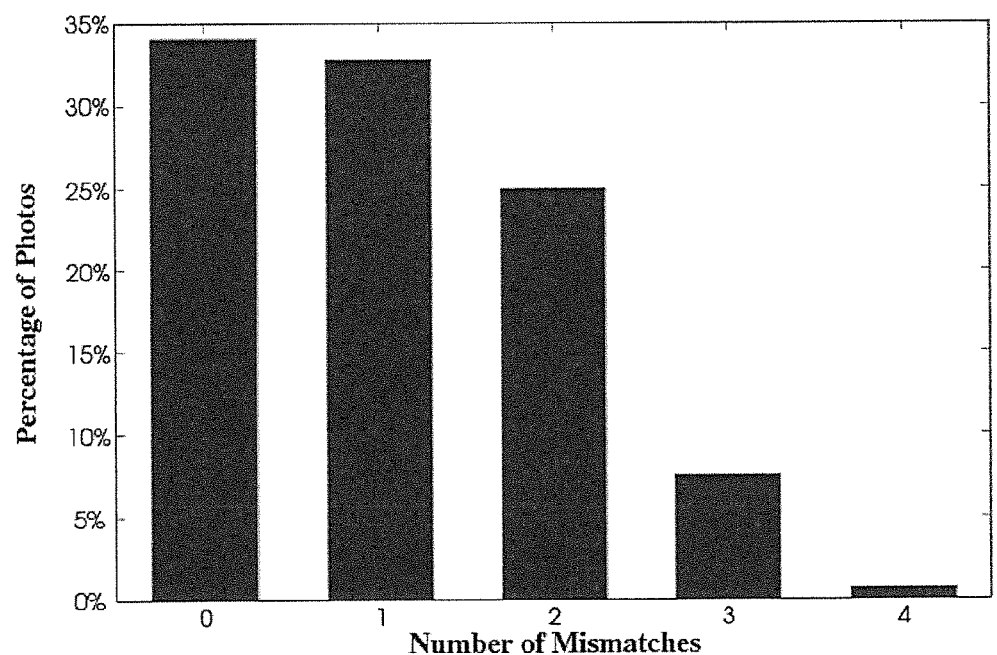
FIG. 24 is a histogram of the number of mismatches between classification by our algorithm and by users. The horizontal axis corresponds to the number of mismatches. The vertical axis corresponds to the percentage of photos.

The precision of the algorithm can also be measured by the number of mismatches between M and U. We say a mismatch occurs if $m_j \neq u_j$, j=0, . . . , 5. We count the number of mismatches for every image and plot the histogram of these counts in FIG. 24.

Evaluation of Retrieved Exemplars

Every user study participant was provided with 15 randomly chosen query images. For each query, we show the participant the combined set of photos retrieved in the top eight images by each of the three ranking schemes based respectively on visual similarity, composition relevance, and aesthetic appeal. We removed the duplicates and shuffled the photos to avoid any redundancy and biases. For each photo, the participants were asked the following "yes/no" questions:
1. Is this photo semantically similar to the query image?
2. Is this photo compositionally relevant to the query image?
3. Is this photo aesthetically appealing?

Figure 25A:
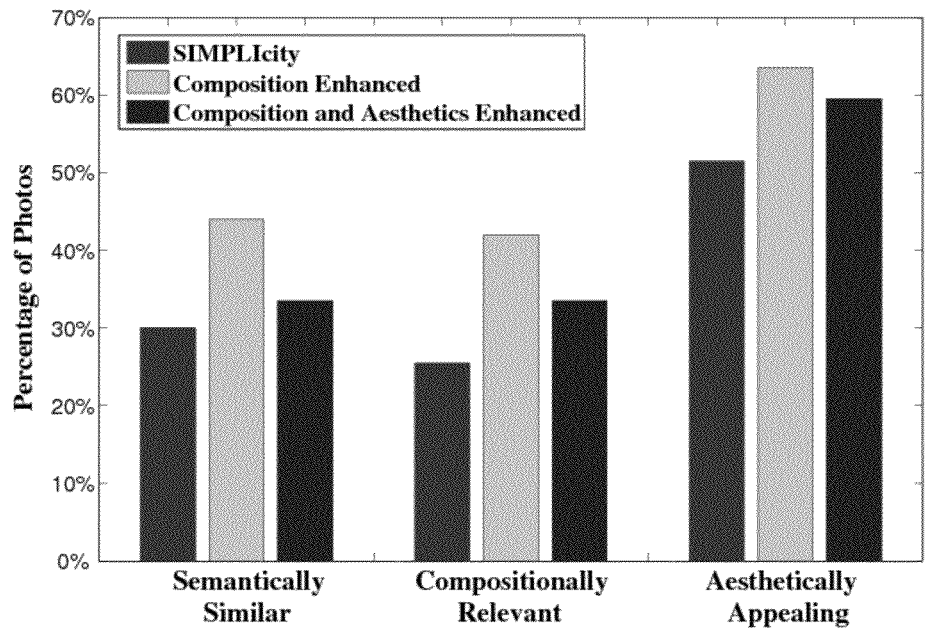
FIGS. 25A and 25B illustrate retrieval accuracy in terms of "semantically similar," "composition relevant" and "aesthetically appealing" for different ranking schemes.
Figure 25B:
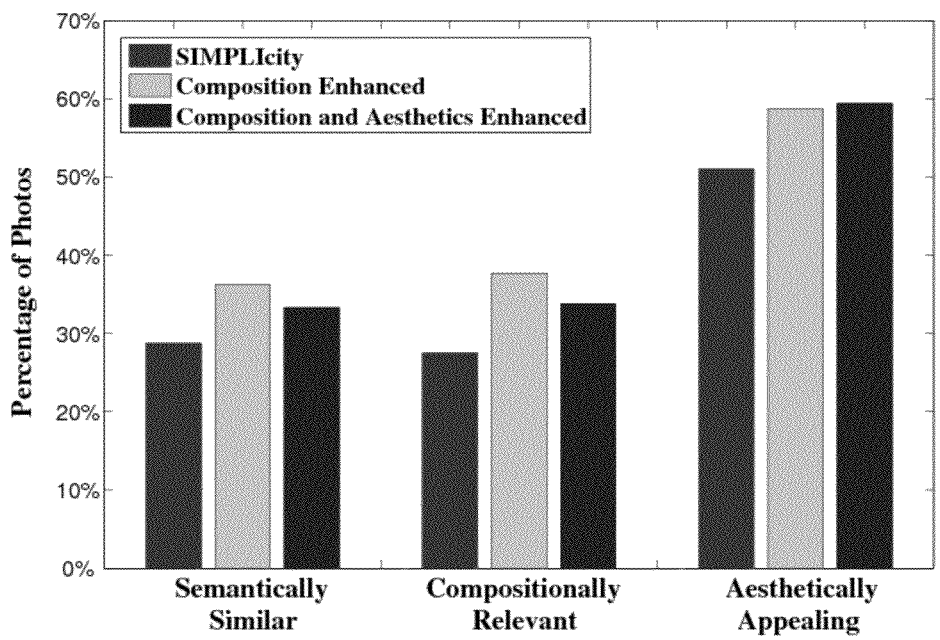

For each ranking scheme, the percentages of retrieved photos that users indicated as semantically similar/compositionally relevant/aesthetically appealing were calculated. FIGS. 25A and 25B compare the performance of the three different ranking schemes. For the top four retrieved images, the re-ranking scheme based on composition yields the best result on all the three accounts; and the re-ranking based on both composition and aesthetics yields the second best. The margin of improvement over the baseline scheme (no re-ranking) is substantial. For the top eight retrieved images, the two re-ranking schemes are still consistently better than without re-ranking. In terms of semantic similarity and compositional relevance, the re-ranking by composition alone is better than re-ranking by both composition and aesthetics; while in terms of aesthetic appeal, the latter is slightly better. The fact that re-ranking by composition improves semantic similarity reflects a positive association between composition and semantics. Images that are composed similarly tend to agree more semantically.

User Perception on Feedbacks

Each user study participant is shown with Web pages displaying the feedbacks OSCAR provides for ten randomly assigned photos. For each photo, the feedbacks include:

Best color triplet: the most aesthetically appealing color combination found in the query photo.

Confidence score of the color triplet: a floating number from 0-100, indicating a triplet's aesthetic quality (100 indicates the best quality), shown beside the triplet.

Aesthetic score: a score profiling the aesthetic quality of the query photo in general, shown as stars (five stars indicate the best quality).

Photo exemplars: high quality photographs used for reference in terms of composition, coloring, etc. We use the re-ranking scheme based on both composition and aesthetics.

Participants are asked to assume that they are the photographers who have taken these photos and to evaluate whether the feedbacks can help improve their photography skills, in terms of composition, coloring, in a general sense. Each participant is requested to indicate her/his level of agreement with the following five statements.

1. The color combination score reflects your impression about the color triplet.
2. The aesthetic score is consistent with your assessment of the photo's aesthetic quality.
3. Some of the photo exemplars can potentially help improve your photography composition.
4. The color triplets can potentially help improve your coloring scheme.
5. The overall feedback can potentially help improve your photography skills in general.

Figure 26:
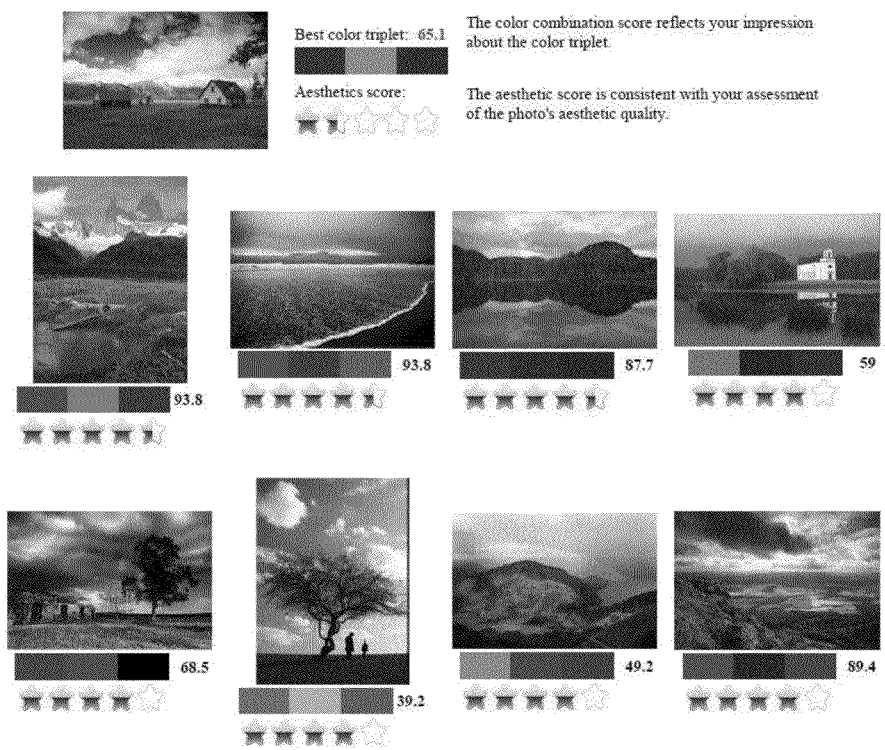
FIG. 26 is a screen shot of a web interface used for analyzing user perceptions on feedback.

The response preference for each statement is based on a 5-point likert scale, i.e., "strongly agree," "agree," "neither agree nor disagree," "disagree" and "strongly disagree." A screen shot of the user study interface is shown in FIG. 26.

Figure 27:
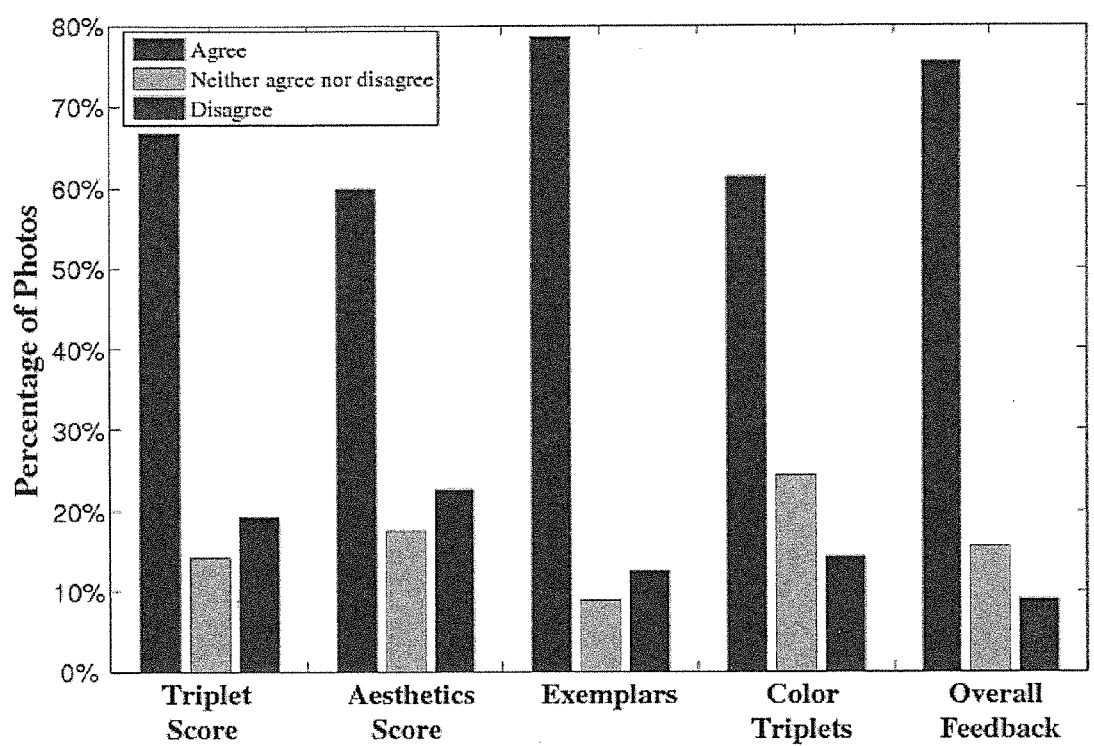
FIG. 27 is a graph showing the distribution of user votes in response to the five statements made on module feedback and overall feedback.

For each statement, we calculated the percentage of votes for every agreement level. For a clearer graphical presentation, we combine the two positive levels "strongly agree" and "agree," and similarly the two negative levels "disagree" and "strongly disagree." FIG. 27 shows the distribution of votes on "agree," "neither agree nor disagree," and "disagree" for the five statements listed above. In the Figure, every group of bars is the result for one statement, arranged from left to right in the same order as in the list above. A majority of votes support the value of the individual modules in the feedback as well as the usefulness of the overall system. For the individual modules, users are most positive about the exemplar photos.

Running Time

Here we report the running time of OSCAR. The modules of OSCAR were tested on a single compute node with 2 quadcore Intel processors running at 2.66 GHz and 24 GB of RAM. For the composition analysis module, the average time to process a 256×256 image is 3.15 seconds, including image segmentation (Li 2011), edge detection (Meer and Georgescu 2001), and composition classification proposed in this paper. For the color combination feedback module, the average time of segmenting an image and obtaining its color triplets with hierarchical mode association clustering (HMAC) algorithm (Li et al. 2007) is 0.58 second while computing the confidence score of the best color triplet takes 0.53 second. Computing aesthetic scores for gray-scale images takes an average of 1.89 seconds including image segmentation, feature extraction and score generation. Initializing retrieval results by SIMPLIcity incurs very low overhead which can be further reduced when running in parallel with other modules. Therefore, for a given image, all the feedback can be provided within a few seconds.

Conclusions and Future Work

We have presented a next generation aesthetic assessment system which is able to provide substantially reliable feedback to the users on improving the aesthetic quality of their photographs as well as providing an assessment on the quality of the images. We bring together various characteristics of a highly aesthetic photograph in order to provide comprehensive feedback on the feature chosen by the user.

Motivated by an old adage, "I hear, I know. I see, I remember. I do, I understand," we believe that practicing is the best way of learning. We try to provide feedback which lets the user learn and infer aesthetic composition characteristics through high quality exemplars. In order to accomplish this we have been able to successfully classify five categories of spatial image composition with reliable accuracy leading us to retrieve images of similar composition with a good precision.

We also assist the user in choosing better color combination by providing a quantitative feedback on the presence of aesthetically pleasing color triplets in the photograph. These color triplets are learnt through a data driven approach, with quantitative values indicating the confidence about their aesthetics.

Last but not the least we have also demonstrated the usefulness of a newer module to assign aesthetic ratings to monochromatic images by evaluating the discriminative power of the visual features. The regression model learnt is able to predict 75.33% of the variability in the noisy ratings. This provides a completion to our pre-existing ACQUINE system which can predict reliable aesthetic ratings of color images. This form of a feedback can be considered both quantitative as well as collective in nature.

Future Work

The five categories of composition can be refined further to include more classes. Our current usage of the spatial signature of an image is quite restrictive, only to classify the composition. We can employ the spatial signature more quantitatively so that the difference in composition is not just categorical agreement or disagreement. For instance, a new pairwise distance between images can be defined to incorporate the spatial signature with the conventional color and texture signature.

A significant step beyond the present analysis of composition is to make on-site automatic suggestions about placement of objects in a photo, which can be achieved by zooming, expanding, tilting, etc. Principles of good composition can be applied based on composition characteristics extracted by the computer. For instance, the diagonal spatial structure provides a sense of dynamism in the image and is highly pleasing. Adjustment made to the image frame to diagonalize the not-so diagonal element can increase the image aesthetics.

New functions can be added in color feedback module to make suggestions about the color temperature, white balance and lighting of the subject, etc. Our color feedback framework can be tested on more color models in order to find the best one for real applications.

The aesthetic feedback system can be improvised by the addition of complex features which can reflect upon the symmetry and forms of the objects present in the image.

Finally, the system improvement lies in making it distributive which can increase the speed of computation by allocating modules to different servers.

REFERENCES

Bhattacharya, S., Sukthankar, R., and Shah, M. (2010). A coherent framework for photo-quality assessment and enhancement based on visual aesthetics. In *Proceedings of ACM Multimedia conference* (pp. 271280).
Chijiiwa, H. (1987) Color harmony. Rockport Publisher.
Cohen-Or, D., Sorkine, O., Gal, R., Leyvand, T. and Xu, Y. (2006). Color harmonization. ACM Transactions on Graphics, 25(3), 624-630.
Datta, R., Joshi, D., Li, J. and Wang, J. Z. (2006). Studying aesthetics in photographic images using a computational approach. In Proceedings of European conference on computer vision, (pp. 288-301).
Datta, R. and Wang, J. Z. (2010). ACQUINE: aesthetic quality inference engine—real-time automatic rating of photo aesthetics. In Proceedings of international conference on multimedia information retrieval, (pp. 421-424).
Davis, H. (2010). Creative black and white. Digital Photography Tips and Techniques. Wiley Publishing Inc.
Feininger, A. (1973). Principles of composition in photography. Thames and Hudson Ltd.
Folts, J. A., Lovell, R. P., and Zwahlen, F. C. (2005). Handbook of photography. Thompson Delmar Learning.
Fogarty, J., Forlizzi, J. and Hudson, S. E. (2001). Aesthetic information collages: generating decorative displays that contain information. In Proceedings of ACM symposium on user interface software and technology, (pp. 141-150).
Gao, X., Xin, J., Sato, T., Hansuebsai, A., Scalzo, M., Kajiwara, K., Guan, S., Valldeperas, J., Lis, M., and Billger, M. (2007). Analysis of cross-cultural color emotion. Color Research and Application, 32(3), 223-229.
Gersho, A., Asymptotically optimal block quantization. (1979) IEEE Transactions on Information Theory, 25(4), 373-380.
Gill, M. (2000). Color harmony pastels—a guidebook for creating great color combinations. Rockport Publisher.
Harel, J., Koch, C., and Perona, P. (2007). Graph-based visual saliency. In Proceedings of advances in neural information processing systems, (pp. 542-552).
Henri, R. (2007). The Art Spirit. Basic Books.
Itten, J. (1960). The Art of Color. New York: Van Nostrand Reinhold.
Karatzoglou, A., Smola, A., Hornik, K., and Zeileis, A. (2004) kernlab—a package for kernel methods in R. Journal of Statistical Software, 11(9), 1-20.
Ke, Y., Tang, X. and Jing, F. (2006). The design of high-level features for photo quality assessment. In *Proceedings of IEEE conference on computer vision and pattern recognition*, (pp. 419-426).
Kisilev, P., Shaked, D., and Lim, S. (2007). Noise and signal activity maps for better imaging algorithms. In *Proceedings of IEEE international conference on image processing*, (Vol. 2, pp. 117-120).
Krages, B. P. (2005). Photography: the art of composition. Allworth Press.
Lamb, J., and Stevens, R. (2010). Eye of the Photographer. The Social Studies Texan, 26(1), 59-63.
Levina, E., Bickel, P. (2001). The Earth Mover's Distance is the Mallows Distance: Some Insights from Statistics. In Proceedings of international conference on computer vision, (pp. 251-256).
Li, J. (2011). Agglomerative Connectivity Constrained Clustering for Image Segmentation. Statistical Analysis and Data Mining, 4(1), pp. 84-99.
Li, J., Ray, S. and Lindsay, B. G. (2007). A nonparametric statistical approach to clustering via mode identification. Journal of Machine Learning Research, 8(8), 1687-1723.
Li, J., Wang, J. Z., and Wiederhold, G. (2000). IRM: integrated region matching for image retrieval. In Proceedings of ACM multimedia conference, (pp. 147156).
Liu, L., Chen, R., Wolf L. and Cohen-Or, D. (2010). Optimizing photo composition. Computer Graphic Forum, 29(2), 469-478.
Luo, Y. and Tang, X. (2008). Photo and video quality evaluation: focusing on the subject. In Proceedings of European conference on computer vision, (pp. 386399).
Mallows, C. L. (1972) A note on asymptotic joint normality. Annals of Mathematical Statistics, 43(2), 508515.

Manav, B. (2007). Color-emotion associations and color preferences: a case study for residences. Color Research and Application, 32(3), 144-150.

Meer, P. and Georgescu, B. (2001). Edge detection with embedded confidence. IEEE Transactions on Pattern Analysis and Machine Intelligence, 23(12), 1351-1365.

Obrador, P. and Moroney, N. (2009). Low level features for image appeal measurement. In Proceedings SPIE conference on image quality and system performance VI, (Vol. 7242, pp. 72420T-1-12)

Obrador, P., Anguera, X., Oliveira, R. and Oliver, N. (2009). The role of tags and image aesthetics in social image search. In Proc. ACM SIGMM workshop on social media, (pp. 65-72).

Obrador, P., Oliveira, R. and Oliver, N. (2010). Supporting personal photo storytelling for social albums. In Proceedings of ACM multimedia conference, (pp. 561-570).

Peters, G. (2007). Aesthetic Primitives of Images for Visualization. In Proceedings of IEEE International Conference on Information Visualization, (pp. 316326)

Rubner, Y., Tomasi, C., and Guibas, L. J. (2000). The earth mover's distance as a metric for image retrieval. International Journal of Computer Vision 40(2), 99121, 2000

Russ, J. C. (2006). The image processing handbook. CRC Press.

Speed, H. (1972). The practice and science of drawing. Dover Publications.

Sternberg, R. J. (2008). Cognitive psychology. Wadsworth Publishing.

Suess, B. J. (1995). Mastering black and white photography: from camera to darkroom. Allworth Press.

Sutton, T., Whelan, B. M. (2004). The complete color harmony. Rockport Publisher.

Taylor, M., Butler, O. and Birnbaum, H. (1995). Kodak workshop series: advanced black-and-white photograph. Kodak Publication.

Tokumaru, M., Muranaka, N. and Imanishi, S. (2002). Color design support system considering color harmony. In Proceedings of IEEE international conference on fuzzy systems, (Vol. 1, pp. 378-383).

Tong, H., Li, M., Zhang, H. and Zhang, C. (2004). Blur detection for digital images using wavelet transform. In Proceedings of IEEE international conference on multimedia & expo, (pp. 17-20).

Wang, J. Z., Li, J., and Wiederhold, G. (2001). SIMPLIcity: semantics-sensitive integrated matching for picture libraries. IEEE Transactions on Pattern Analysis and Machine Intelligence, 23(9), 947-963.

Wong, L. and Low, K. (2009). Saliency-enhanced image aesthetics class prediction. In Proceedings of IEEE international conference on image processing, (pp. 993-996).

Warren, B. (2002). Photography: the concise guide. Delmar Cengage Learning.

The invention claimed is:

1. A method of assessing the aesthetic quality of a digital image, comprising the steps of:
    receiving a digital image at a computer server;
    automatically computing a plurality of composition categories associated with the image at the computer server, the composition categories including:
        horizontal, vertical, or centered,
        diagonal, and
        textured versus non-textured; and
    providing feedback to a user regarding the aesthetic quality of the image based upon the composition categories.

2. The method of claim 1, wherein the composition categories are automatically computed using the following three classifiers:
    a diagonal element detector,
    a textured versus non-textured classifier, and
    a k-Nearest Neighbors k_NN algorithm.

3. The method of claim 1, including the steps of:
    storing a database of digital images at the server;
    using the composition categories to determine if any of the images in the database are similar; and
    providing feedback by retrieving and delivering any similar images to a user.

4. The method of claim 3, further including the use of overall visual similarity or predetermined aesthetic scores to determine if any of the images in the database are similar.

5. The method of claim 1, including the steps of:
    analyzing attributes of the image at the server to determine color combinations associated with the image; and
    providing feedback to a user regarding the most aesthetically pleasing color combinations.

6. The method of claim 5, wherein the color combinations are color triples.

7. The method of claim 1, including the steps of:
    analyzing attributes of the image at the server to determine an aesthetic rating associated with the image; and
    providing the rating to a user as feedback.

8. The method of claim 1, wherein the image is a color or a black-and-white image.

9. The method of claim 1, including the steps of:
    providing a database of images with predetermined aesthetic ratings;
    analyzing low-level features of an image;
    retrieving one or more images from the database having the highest aesthetic ratings based upon the low-level features; and
    providing feedback to a user by recommending one or more of the images having the highest aesthetic ratings.

10. The method of claim 9, wherein:
    the image is a color photograph; and
    the low-level features include one or more of light, colorfulness, size and aspect ratio.

11. The method of claim 9, wherein:
    the image is a black-and-white photograph; and
    the low-level features include one or more of contrast, details, shapes, and saliency.

12. The method of claim 1, wherein the feedback includes assisting a user with automatic composition analysis or color evaluation.

13. The method of claim 1, wherein the feedback takes into account a user's past photo-taking behavior.

14. The method of claim 1, wherein the feedback is delivered to a user through a camera or other image-capturing device.

15. The method of claim 14, wherein the image-capturing device and the server are integrated into a single, portable unit.

16. The method of claim 14, wherein:
    the image-capturing device is in network communication with the server; and
    the digital photograph is sent to the server and the feedback is sent to the image-capturing device over the network.

17. The method of claim 14, wherein the image-capturing device is a mobile, wireless device.

* * * * *